(12) United States Patent
Sube et al.

(10) Patent No.: US 9,409,719 B2
(45) Date of Patent: Aug. 9, 2016

(54) CONVEYING APPARATUS

(71) Applicant: Sumitomo Riko Company Limited, Aichi-ken (JP)

(72) Inventors: Shinya Sube, Aichi-ken (JP); Mitsuyoshi Kondo, Aichi-ken (JP); Katsuhiko Nakano, Aichi-ken (JP); Atsushi Muramatsu, Aichi-ken (JP); Masaru Murayama, Aichi-ken (JP)

(73) Assignee: SUMITOMO RIKO COMPANY LIMITED, Aichi-Ken (JP)

( * ) Notice: Subject to any disclaimer, the term of this patent is extended or adjusted under 35 U.S.C. 154(b) by 0 days.

(21) Appl. No.: 14/935,535

(22) Filed: Nov. 9, 2015

(65) Prior Publication Data
US 2016/0060044 A1 Mar. 3, 2016

Related U.S. Application Data

(63) Continuation of application No. PCT/JP2014/076165, filed on Sep. 30, 2014.

(30) Foreign Application Priority Data

Oct. 1, 2013 (JP) ................... 2013-206478

(51) Int. Cl.
*B65G 27/24* (2006.01)
*B65G 54/02* (2006.01)
*H02N 11/00* (2006.01)

(52) U.S. Cl.
CPC ............... *B65G 27/24* (2013.01); *B65G 54/02* (2013.01); *H02N 11/00* (2013.01)

(58) Field of Classification Search
CPC .................. B65G 54/00; B65G 54/04; B65G 27/00–27/34; H02N 11/00
USPC ........................................................ 198/769
See application file for complete search history.

(56) References Cited

U.S. PATENT DOCUMENTS

| | | | |
|---|---|---|---|
| 4,763,776 A * | 8/1988 | Okumura | B65G 27/00 198/630 |
| 6,185,084 B1 * | 2/2001 | Tai | B03C 3/885 361/225 |

(Continued)

FOREIGN PATENT DOCUMENTS

| | | |
|---|---|---|
| JP | 59-36271 | 2/1984 |
| JP | 2-206727 | 8/1990 |

(Continued)

OTHER PUBLICATIONS

Search Report issued in PCT/JP2014/076165 and English translation thereof, dated Dec. 22, 2014.

(Continued)

*Primary Examiner* — Mark A Deuble
(74) *Attorney, Agent, or Firm* — Greenblum & Bernstein, P.L.C.

(57) ABSTRACT

Provided is a conveying apparatus having simple mechanical and electrical configurations. The conveying apparatus includes: a conveying member that has a dielectric layer having insulating properties and made of an elastomer and a pair of electrode layers placed on both front and back sides of the dielectric layer and having conductive properties, and that is divided into a base portion and a conveying portion being more easily elastically deformed than the base portion and having on its surface a conveying path on which an object to be transported is transported; and a power supply unit that applies between the pair of electrode layers a voltage that changes periodically with time. The conveying portion is elastically extended and contracted with the base portion as a starting point according to a change in the voltage, so that the conveying apparatus transports the object on the conveying path.

13 Claims, 27 Drawing Sheets

(56) References Cited

U.S. PATENT DOCUMENTS

| | | | | |
|---|---|---|---|---|
| 2002/0088693 A1* | 7/2002 | Takasan | ............... | B65G 54/00 198/752.1 |
| 2005/0036878 A1* | 2/2005 | Petrin | ................... | B65G 27/24 414/749.1 |
| 2014/0190791 A1* | 7/2014 | Kimura | ................. | B65G 27/32 198/348 |

FOREIGN PATENT DOCUMENTS

| | | |
|---|---|---|
| JP | 2-215631 | 8/1990 |
| JP | 7-327378 | 12/1995 |
| JP | 11-59856 | 3/1999 |
| JP | 11-194595 | 7/1999 |
| JP | 2002-68477 | 3/2002 |
| JP | 2003-506858 | 2/2003 |
| JP | 2005-1885 | 1/2005 |
| JP | 2009-59856 | 3/2009 |
| WO | 01/06575 | 1/2001 |
| WO | 01/06579 | 1/2001 |
| WO | WO 2009037774 A1 * 3/2009 ............ B65G 27/04 |

OTHER PUBLICATIONS

International Preliminary Report on Patentability and English language translation thereof, mail date is Apr. 14, 2016.

* cited by examiner

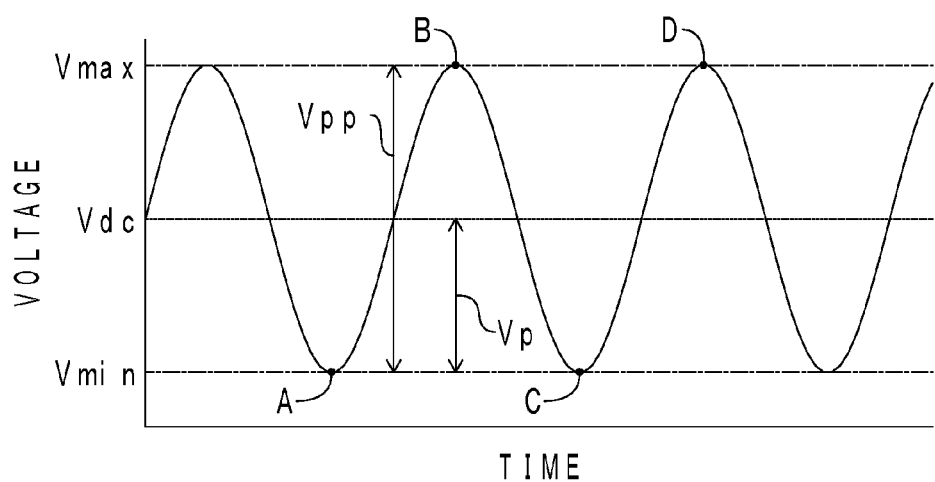
F I G. 3

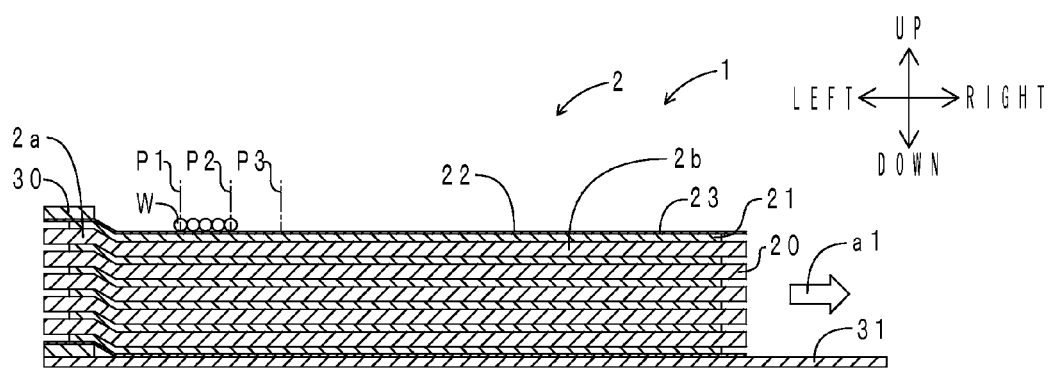
F I G. 4 A

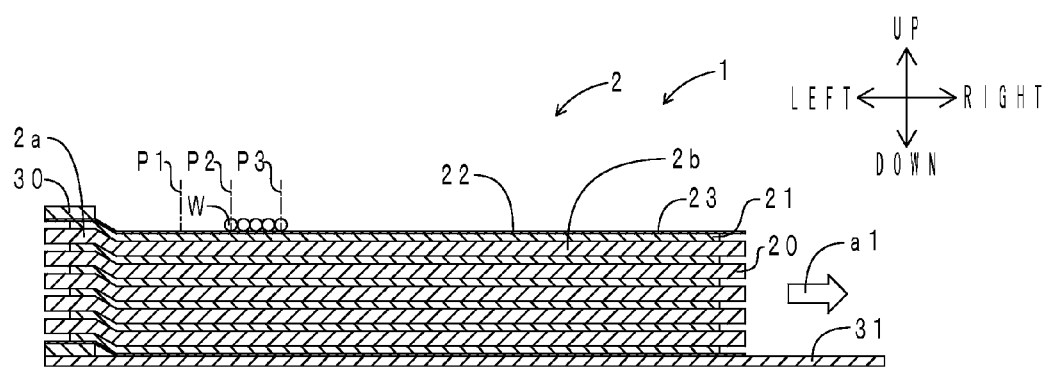
F I G. 4 C

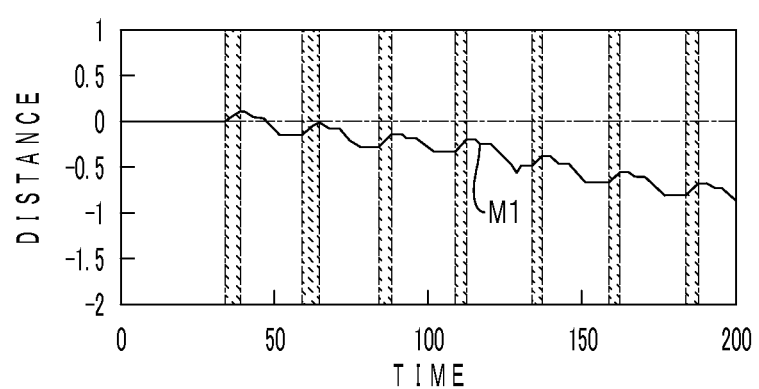
F I G. 1 2

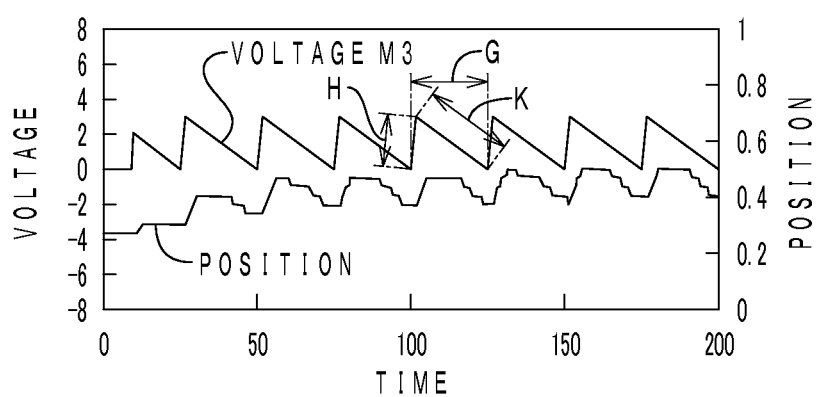
F I G. 15

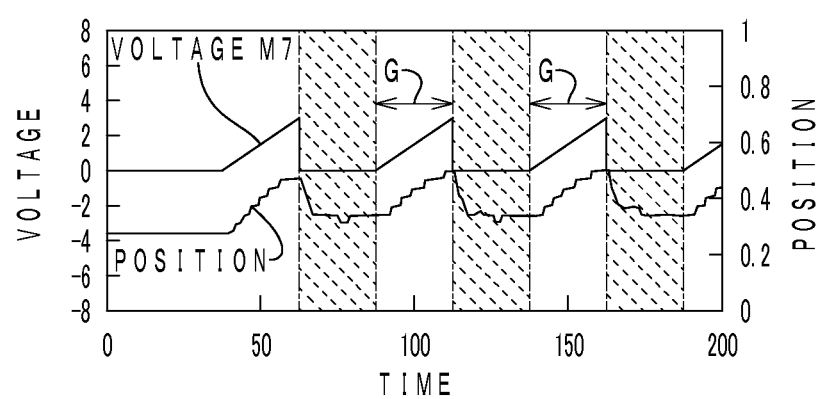
F I G. 20

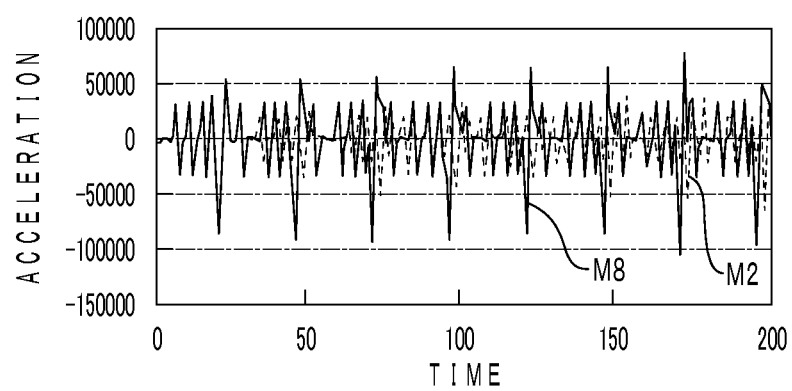
F I G. 2 3

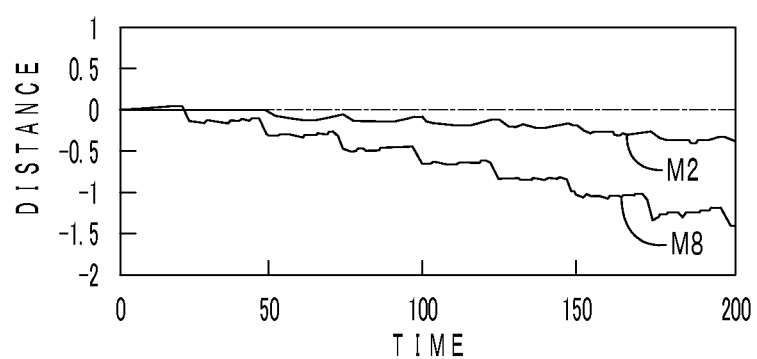
F I G. 2 4

CONVEYING APPARATUS

RELATED APPLICATIONS

This application is a Continuation of International Application No. PCT/JP2014/076165, filed Sep. 30, 2014, which claims the benefit of Japanese patent application No. 2013-206478, filed Oct. 1, 2013, the disclosures of which are incorporated by reference herein in their entireties.

TECHNICAL FIELD

The present invention relates to conveying apparatuses capable of conveying, e.g., powder such as flour and salt and grains such as tablets.

BACKGROUND ART

Patent Document 1 discloses a fine powder conveying apparatus. The fine powder conveying apparatus includes a multiplicity of electrodes. The multiplicity of electrodes are arranged next to each other in a conveying direction. An AC voltage is applied to the multiplicity of electrodes in the conveying direction. Powder is attracted by the Coulomb force to move between adjoining ones of the electrodes. Patent Document 2 discloses a powder handling apparatus including a multiplicity of electrodes arranged next to each other in a conveying direction as in Patent Document 1.

RELATED ART DOCUMENTS

Patent Documents

Patent Document 1: Japanese Patent Application Publication No. 2002-68477 (JP 2002-68477 A)
Patent Document 2: Japanese Patent Application Publication No. H07-327378 (JP H07-327378 A)

SUMMARY OF THE INVENTION

Problem to be Solved by the Invention

According to the fine powder conveying apparatus of Patent Document 1 and the powder handling apparatus of Patent Document 2, the multiplicity of electrodes need be arranged in the conveying direction along the entire length in the conveying direction of the apparatus, and an AC voltage need be applied to the multiplicity of electrodes so that powder can be transported. The fine powder conveying apparatus of Patent Document 1 and the powder handling apparatus of Patent Document 2 therefore have complicated mechanical and electrical configurations. It is an object of the present invention to provide a conveying apparatus having simple mechanical and electrical configurations.

Means for Solving the Problem (1) In order to solve the above problem, a conveying apparatus according to the present invention is characterized by including: a conveying member that has a dielectric layer having insulating properties and made of an elastomer and a pair of electrode layers placed on both front and back sides of the dielectric layer and having conductive properties, and that is divided into a base portion and a conveying portion being more easily elastically deformed than the base portion and having on its surface a conveying path on which an object to be transported is transported; and a power supply unit that applies between the pair of electrode layers a voltage that changes periodically with time, wherein the conveying portion is elastically extended and contracted with the base portion as a starting point according to a change in the voltage, so that the object is transported on the conveying path.

As used herein, the "AC voltage" refers to a voltage that periodically changes with time, and the "DC voltage" refers to a voltage whose polarity is not inverted. The magnitude of the voltage does not have to be constant. That is, in this specification, the DC voltage may be conceptually included in the AC voltage. The "AC power supply" refers to a power supply capable of supplying an AC voltage whose polarity is inverted. The "DC power supply" refers to a power supply capable of supplying a DC voltage. The DC voltage includes a bias voltage having constant magnitude.

The conveying apparatus of the present invention includes the dielectric layer and the pair of electrode layers. When a voltage is applied between the pair of electrode layers, an electrostatic attractive force is applied between the pair of electrode layers. The electrostatic attractive force is applied in such a direction that the dielectric layer, namely the conveying portion, is contracted in a stacking direction (direction in which the dielectric layer and the electrode layers are stacked). The dielectric layer is elastically deformable. That is, the dielectric layer has an elastic restoring force. The elastic restoring force is applied in such a direction that the dielectric layer, namely the conveying portion, is extended in the stacking direction. The conveying portion is thus subjected to the electrostatic attractive force and the elastic restoring force. The shape of the conveying portion is elastically changed by the balance between these forces.

As the voltage increases, the electrostatic attractive force between the pair of electrode layers increases accordingly. The conveying portion is therefore contracted in the stacking direction against the elastic restoring force of the dielectric layer. The conveying portion is extended in a planar direction (direction in which the surface of the conveying portion extends) according to the amount of contraction of the conveying portion in the stacking direction. As the voltage decreases, the electrostatic attractive force between the pair of electrode layers decreases accordingly. The conveying portion is therefore extended in the stacking direction by the elastic restoring force of the dielectric layer. The conveying portion is contracted in the planar direction according to the amount of extension of the conveying portion in the stacking direction.

The conveying portion can thus be repeatedly elastically extended and contracted according to a change in voltage. The base portion is less likely to be elastically deformed than the conveying portion. Accordingly, the conveying portion can be repeatedly elastically extended and contracted with the base portion as a starting point. In other words, the conveying portion can vibrate with the base portion as a starting point. The conveying portion can transport the object on the conveying path.

According to the conveying apparatus of the present invention, a multiplicity of electrodes need not be placed along the conveying path along the entire length of the conveying path. An AC voltage need not be applied to the multiplicity of electrodes so that the object can be transported. The conveying apparatus therefore has simple mechanical and electrical configurations. Moreover, the conveying apparatus can transport the object regardless of electrical characteristics (conductive properties, insulating properties, etc.) of the object.

In typical vibrating conveyors, a hard (e.g., steel) trough having a conveying path is vibrated by a multiplicity of coil springs. The trough itself is not elastically deformed. In the conveying apparatus of the present invention, the dielectric layer is made of a flexible (low Young's modulus) elastomer. The dielectric layer can therefore absorb the impact of the vibration of the conveying portion on the object. Accordingly, the object is less likely to be damaged by the vibration of the conveying portion when the object is being transported.

(1-1) In the configuration of (1), a stacking direction is a direction in which the dielectric layer and the electrode layers are stacked, and a conveying direction is a direction in which the conveying path extends on the surface of the conveying portion. A contracted state is a state where the conveying portion has been extended to the maximum in the stacking direction and has been contracted to the maximum in the conveying direction, and an extended state is a state where the conveying portion has been contracted to the maximum in the stacking direction and has been extended to the maximum in the conveying direction. Extension acceleration is acceleration of deformation of the conveying path in the conveying direction when the conveying path switches from the contracted state to the extended state, and contraction acceleration is acceleration of deformation of the conveying path in the conveying direction when the conveying path switches from the extended state to the contracted state. It is desirable that the extension acceleration be different from the contraction acceleration.

In the case where the acceleration of deformation of the conveying path is small, the object is less likely to be shifted with respect to the conveying path when the conveying path is deformed. Accordingly, the object tends to move according to deformation of the conveying path. On the other hand, in the case where the acceleration of deformation of the conveying path is large, the object tends to be shifted with respect to the conveying path when the conveying path is deformed. Accordingly, the object is less likely to move according to deformation of the conveying path.

According to this configuration, the acceleration of deformation varies between when the conveying path switches from the contracted state to the extended state and when the conveying path switches from the extended state to the contracted state. Accordingly, the object can be preferentially moved either when the conveying path switches from the contracted state to the extended state or when the conveying path switches from the extended state to the contracted state. According to this configuration, the conveying direction of the object can therefore be controlled.

(2) In the configuration of (1), it is preferable that a conveying direction be a direction in which the conveying path extends on the surface of the conveying portion, and the base portion be placed at one end or the other end of the conveying path in the conveying direction.

According to this configuration, the conveying portion can be vibrated along the entire length of the converting path with the base portion as a starting point. This can increase the distance by which the object is transported in one stroke (from the contracted state through the extended state to the contracted state or from the extended state through the contracted state to the extended state).

(3) In the configuration of (1) or (2), it is preferable that the conveying apparatus further include a restraining member that restrains a part of the conveying member, and the base portion be formed by restraining the part of the conveying member by the restraining member.

According to this configuration, a part of the conveying member is restrained by the restraining member, whereby the conveying member can be divided into the base portion and the conveying portion. That is, a part of the conveying member is restrained by the restraining member, whereby the base portion can be set in the part of the conveying member, and the conveying portion can be set in the remaining part of the conveying member (the part that is not restrained by the restraining member). According to this configuration, elastic deformation and positional shifting of the base portion associated with vibration of the conveying portion can be suppressed.

(4) In the configuration of any one of (1) to (3), it is preferable that the conveying direction be the direction in which the conveying path extends on the surface of the conveying portion, a lateral direction be a direction perpendicular to the conveying direction, and a total length of the conveying path in the conveying direction be larger than that of the conveying path in the lateral direction.

According to this configuration, the amount of extension/contraction of the conveying path can be made larger in the conveying direction than in the lateral direction. This can increase the distance by which the object is transported in one stroke.

(5) In the configuration of any one of (1) to (4), it is preferable that the conveying member have a protective layer having insulating properties and made of an elastomer, the protective layer being placed on the frontmost electrode layer.

The protective layer is made of an elastomer and is flexible. According to this configuration, the electrode layer can therefore be protected from the outside. The protective layer has insulating properties. According to this configuration, the electrode layer can thus be electrically insulated from the outside.

(6) In the configuration of any one of (1) to (5), it is preferable that the conveying apparatus further include: a backing member that is placed on a back side of the conveying member and that slide-contacts the conveying portion when the conveying portion is elastically extended and contracted. According to this configuration, the conveying member can slide-contact the backing member when being elastically deformed.

(6-1) In the configuration of (6), it is preferable that the backing member be made of a resin or a metal. This configuration reduces frictional resistance that is caused when the conveying portion slide-contacts the backing member. Elastic deformation of the conveying portion is therefore less likely to be restricted by the backing member.

(7) In the configuration of any one of (1) to (6), it is preferable that the power supply unit have a DC power supply capable of supplying a voltage whose polarity is not inverted (i.e., a DC voltage) or an AC power supply capable of supplying a voltage whose polarity is inverted and a waveform adjustment unit that adjusts a waveform of the voltage that is supplied from the DC power supply or the AC power supply. According to this configuration, the waveform of the voltage that is supplied from the DC power supply or the AC power supply can be adjusted by the waveform adjustment unit.

(8) In the configuration of any one of (1) to (6), it is preferable that the power supply unit have a DC power supply capable of supplying a bias voltage whose polarity is not inverted and which has constant magnitude and an AC power supply capable of supplying a voltage whose polarity is inverted. According to this configuration, the DC voltage and the AC voltage can be applied to the conveying member so as to be superimposed on each other. The AC voltage can therefore be applied to the conveying member based on a predetermined bias voltage.

(9) In the configuration of any one of (1) to (8), it is preferable that the voltage that is applied between the pair of electrode layers by the power supply unit be a DC voltage whose polarity is not inverted. According to this configuration, a voltage which changes periodically with time and whose polarity is not inverted can be applied between the pair of electrode layers.

(9-1) In the configuration of (9), it is preferable that the DC voltage have one of a triangular waveform, a sawtooth waveform, and a rectangular waveform. According to this configuration, the waveform can be easily produced. Extension and contraction of the conveying portion can therefore be easily controlled.

(9-2) In the configuration of (9), it is preferable that a waveform of a change in the DC voltage with time is a continuous waveform or a pulse waveform. According to this configuration, the frequency can be easily adjusted. The conveying speed can therefore be easily controlled.

(10) In the configuration of (9), it is preferable that a waveform, for one period, of a change in the DC voltage with time have a boost section where the DC voltage increases with time and a step-down section where the DC voltage decreases with time, and an absolute value of a time differential value of the DC voltage in the boost section be smaller than that of the time differential value of the DC voltage in the step-down section.

As used herein, the "time differential value of the DC voltage" refers to the time rate of change of the DC voltage (dV/dt, gradient), where V represents the DC voltage and t represents time. In the case where the time differential value of the DC voltage is not constant in the boost section and the step-down section, that is, in the case where a second-order time differential value ($d^2V/dt^2$) is not 0, the "absolute value of the time differential value" refers to the maximum value of the absolute value of the time differential value. For example, in the case where there is a plurality of sections (a linear section, a curved section having a constant curvature, a curved section in which the curvature varies, etc.) in the boost section or the step-down section, the "absolute value of the time differential value" refers to the largest one of the absolute values of the time differential values in the plurality of sections.

The conveying portion is extended so as to correspond to the boost section. That is, the conveying portion switches from the contracted state to the extended state of (1-1). The time differential value of the DC voltage in the boost section corresponds to the extension acceleration in (1-1). The larger the absolute value of the time differential value is, the larger the extension acceleration is.

The conveying portion is contracted so as to correspond to the step-down section. That is, the conveying portion switches from the extended state to the contracted state of (1-1). The time differential value of the DC voltage in the step-down section corresponds to the contraction acceleration in (1-1). The larger the absolute value of the time differential value is, the larger the contraction acceleration is.

According to this configuration, the absolute value of the time differential value of the DC voltage in the boost section is smaller than that of the time differential value of the DC voltage in the step-down section. The conveying portion can therefore be slowly extended and quickly contracted. Accordingly, the object is less likely to be shifted with respect to the transport path when the conveying portion is extended. The object therefore tends to move according to extension of the conveying portion. Moreover, the object tends to be shifted with respect to the transport path when the conveying portion is contracted. The object is therefore less likely to move according to contraction of the conveying portion.

As described above, this configuration uses inertia of the object, whereby the object can be efficiently transported when the conveying portion is extended. Moreover, movement of the object in the reverse direction can be suppressed when the conveying portion is contracted.

(11) In the configuration of any one of (1) to (10), it is preferable that the conveying apparatus further include: a control unit that controls the power supply unit. According to this configuration, the waveform, period, etc. of the voltage can be controlled by the control unit via the power supply unit.

(11-1) In the configuration of (11), it is preferable that the control unit control the power supply so that the voltage has a predetermined waveform and a predetermined period. According to this configuration, the waveform and the period of the voltage can be set to predetermined values. The waveform and the period of the voltage may be stored in a memory unit of the control unit.

(12) In the configuration of (11), it is preferable that the conveying apparatus further include: a detection unit that detects extension and contraction of the conveying portion, and the control unit control the power supply unit based on a detection value of the detection unit. According to this configuration, the power supply unit can be controlled based on extension and contraction of the conveying portion. For example, when the conveying portion switches from the extended state through the contracted state to the extended state of (1-1), the control unit may start extending the conveying portion by using the power supply unit after verifying that contraction of the conveying portion has been completed by using the detection unit. This can ensure a similar conveying speed and reduce the frequency of the voltage that is applied from the power supply unit to the pair of electrode layers, as compared to the case where the control unit starts extending the conveying portion before contraction of the conveying portion is completed.

(12-1) In the configuration of (12), it is preferable that a detection position be set on the conveying path, and the detection unit be a displacement sensor that detects displacement of the detection position which is associated with extension and contraction of the conveying portion. According to this configuration, the power supply unit can be controlled based on the displacement of the detection position.

(13) In the configuration of any one of (1) to (12), it is preferable that the conveying direction be the direction in which the conveying path extends on the surface of the conveying portion, the lateral direction be the direction perpendicular to the conveying direction, the electrode layer have a plurality of strip portions extending in the conveying direction and arranged next to each other in the lateral direction, and clearance be provided between a pair of the strip portions adjacent to each other in the lateral direction.

According to this configuration, the clearance is provided between the pair of strip portions adjacent to each other in the lateral direction. This can reduce the area of the electrode layers as compared to the case where the clearance is not provided, and can therefore reduce a current value required to drive the conveying portion while ensuring a similar or higher conveying speed as compared to the case where the clearance is not provided. According to this configuration, the pair of strip portions adjacent to each other in the lateral direction is less likely to restrict extension and contraction of each other's strip portion. The plurality of strip portions are therefore easily extended and contracted in the conveying direction.

Effects of the Invention

The present invention can provide a conveying apparatus having simple mechanical and electrical configurations.

BRIEF DESCRIPTION OF THE DRAWINGS

FIG. 3 is a schematic diagram of a voltage that is applied to a conveying member.

FIG. 4A is a sectional view taken in the left-right direction, showing a contracted state (first contracted state) of the conveying apparatus. FIG. 4C is a sectional view taken in the left-right direction, showing a contracted state (second contracted state) of the conveying apparatus.

FIG. 12 is a graph showing a change in distance with time in the case of FIG. 11.

FIG. 15 is a graph showing a change in position with time in the case where a voltage has a right triangular waveform with a sharply increasing gradient to the left.

FIG. 20 is a graph showing a change in position with time in the case where a voltage has a right triangular waveform with a sharply increasing gradient to the right and an interval during which the voltage is off is set between each pair of waves that are located next to each other in chronological order.

FIG. 23 is a graph showing acceleration of extension/contraction of a conveying portion in the case of FIG. 22.

FIG. 24 is a graph showing a change in distance with time in the case of FIG. 22.

MODES FOR CARRYING OUT THE INVENTION

Figure 1:
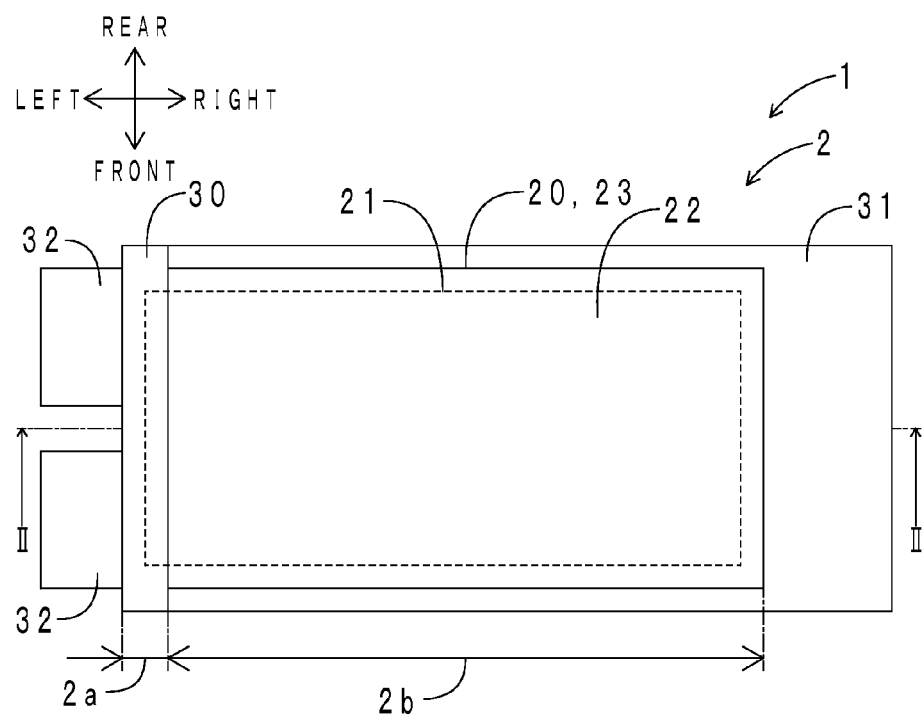
FIG. 1 is a top view of a conveying apparatus of a first embodiment.

Embodiments of a conveying apparatus of the present invention will be described below. In the drawings described below, the upper side corresponds to the "front side" of the present invention, the lower side corresponds to the "back side" of the present invention, the left-right direction corresponds to the "conveying direction" of the present invention, and the front-rear direction corresponds to the "lateral direction" of the present invention. The up-down direction corresponds to the "stacking direction," and the front-rear and left-right directions correspond to the "planar direction."

First Embodiment

[Configuration of Conveying Apparatus]

Figure 2:
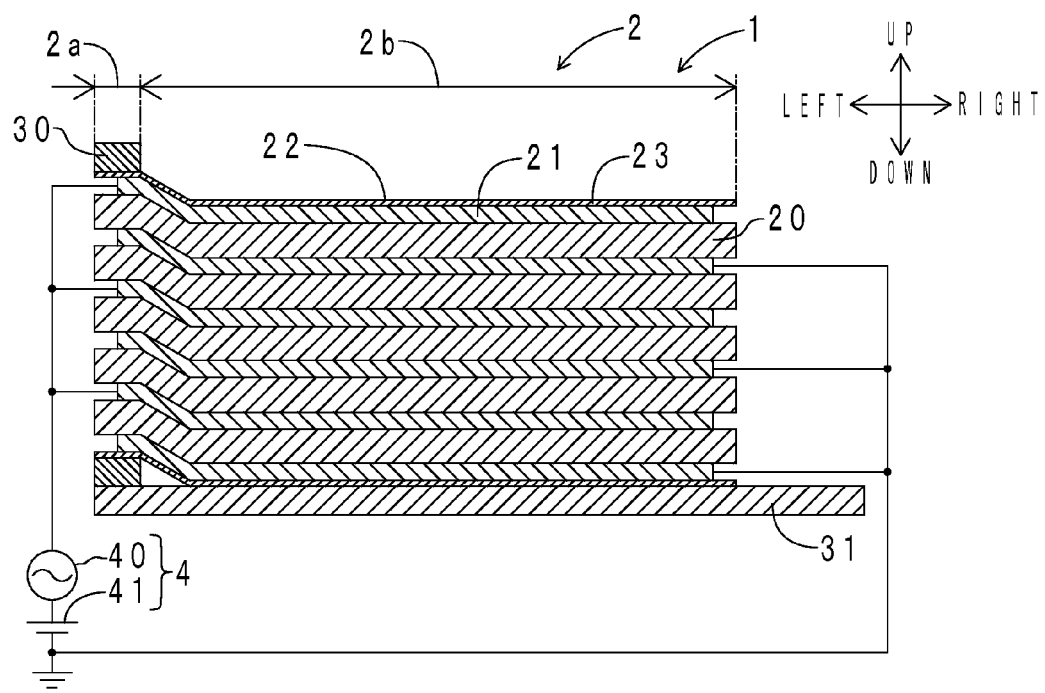
FIG. 2 is a sectional view taken in the direction II-II in FIG. 1.

First, the configuration of a conveying apparatus of the present embodiment will be described. FIG. 1 is a top view of the conveying apparatus of the present embodiment. FIG. 2 is a sectional view taken in the direction II-II in FIG. 1. For convenience of description, the thickness in the up-down direction of the conveying apparatus is shown exaggerated in FIG. 2. As shown in FIGS. 1 and 2, the conveying apparatus 1 of the present embodiment includes a conveying member 2, a restraining member 30, a backing member 31, a pair of front and rear connectors 32, and a power supply unit 4.

The conveying member 2 includes a total of five dielectric layers 20, a total of six electrode layers 21, and a pair of upper and lower protective layers 23. The dielectric layers 20 are made of hydrogenated nitrile rubber (H-NBR) and have a rectangular shape that is long in the left-right direction. H-NBR is included in the concept of the "elastomer" of the present invention. The dielectric layers 20 are flexible and have insulating properties. Each dielectric layer 20 has a thickness of 20 μm in the stacking direction.

The electrode layers 21 are made of an electrode material as acrylic rubber filled with carbon powder. The electrode layers 21 are formed by printing paint containing the electrode material onto the dielectric layers 20. The electrode layers 21 have a rectangular shape that is long in the left-right direction. The electrode layers 21 are flexible and have conductive properties. Each electrode layer 21 has a thickness of 15 μm in the stacking direction.

The six electrode layers 21 and the five dielectric layers 20 are alternately stacked in the up-down direction. The dielectric layer 20 is interposed between each pair of electrode layers 21 adjacent to each other in the up-down direction. The odd numbered (first, third, and fifth) electrode layers 21 from the top are electrically connected to an AC power supply 40 described below. The even numbered (second, fourth, and sixth) electrode layers 21 from the top are electrically connected to a DC power supply 41 described below.

The protective layers 23 are made of butyl rubber (IIR) and have a rectangular shape that is long in the left-right direction. IIR is included in the concept of the "elastomer" of the present invention. The protective layers 23 are flexible and have insulating properties. Each protective layer 23 has a thickness of 5 μm in the stacking direction. The upper protective layer 23 is placed on the upper side of the uppermost electrode layer 21. The lower protective layer 23 is stacked on the lower side of the lowermost electrode layer 21.

The conveying member 2 is divided into a base portion 2a and a conveying portion 2b. The base portion 2a is restrained in the up-down direction by the restraining member 30 described below. The base portion 2a is set at the left end of a conveying path 22 described below by this restraint. The conveying portion 2b is set on the right side of the base portion 2a. The conveying portion 2b can alternately switch between an extended state and a contracted state according to a change in voltage described below. That is, the conveying portion 2b can vibrate. The conveying path 22 is disposed on the upper surface of the conveying portion 2b (specifically, the upper surface of the upper protective layer 23). The conveying path 22 extends linearly in the left-right direction. The left end of the conveying path 22 corresponds to the upstream end in the conveying direction, and the right end of the conveying path 22 corresponds to the downstream end in the conveying direction.

The restraining member 30 is made of a hard resin and has the shape of a clamp. The restraining member 30 has insulating properties. The restraining member 30 sandwiches the base portion 2a in the up-down direction. Elastic deformation of the base portion 2a is thus restricted as compared to the conveying portion 2b.

The backing member 31 is made of a hard acrylic resin and has a rectangular shape that is long in the left-right direction. The backing member 31 has insulating properties. The backing member 31 is disposed on the lower side of the conveying member (specifically, on the lower side of the lower protective layer 23). The backing member 31 has a flat (smooth) upper surface. The restraining member 30 is fixed to the left edge of the upper surface of the backing member 31. That is, the base portion 2a is fixed to the backing member 31 via the restraining member 30. The conveying portion 2b is not fixed to the backing member 31. When the conveying portion 2b switches between the extended state and the contracted state as described below, the lower surface of the conveying portion 2b (specifically, the lower surface of the lower protective layer 23) slide-contacts the upper surface of the backing member 31.

The connectors 32 connect to the base portion 2a. The front connector 32 is electrically connected to the odd numbered electrode layers 21 from the top via a wire (not shown) that is made of silver paste and placed in the base portion 2a. The rear connector 32 is electrically connected to the even numbered electrode layers 21 from the top via a wire (not shown) placed in the base portion 2a.

The power supply unit 4 includes the AC power supply 40 and the DC power supply 41. The AC power supply 40 is electrically connected to the front connector 32. The DC power supply 41 is electrically connected to the rear connector 32.

FIG. 3 is a schematic diagram of a voltage that is applied to the conveying member. As shown in FIG. 3, the AC power supply 40 applies an AC voltage of a sinusoidal waveform to the conveying member 2. The DC power supply 41 applies a DC voltage (bias voltage) to the conveying member 2. Specifically, the AC power supply 40 produces a voltage whose polarity is inverted at 0 V. The DC power supply 41 produces a bias voltage of constant magnitude. The DC voltage and the AC voltage are applied to the conveying member 2 so as to be superimposed on each other. The amplitude Vp of the AC voltage is smaller than the DC voltage Vdc. A peak-to-peak value Vpp is the difference between maximum and minimum values Vmax, Vmin of the AC voltage. The peak-to-peak value Vpp is twice the amplitude Vp.

[Movement of Conveying Apparatus]

Figure 4B:
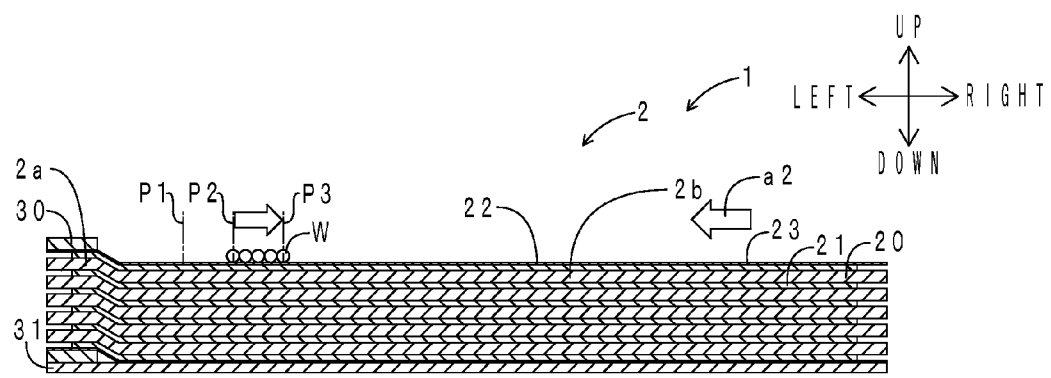
FIG. 4B is a sectional view taken in the left-right direction, showing an extended state (first extended state) of the conveying apparatus.
Figure 4D:
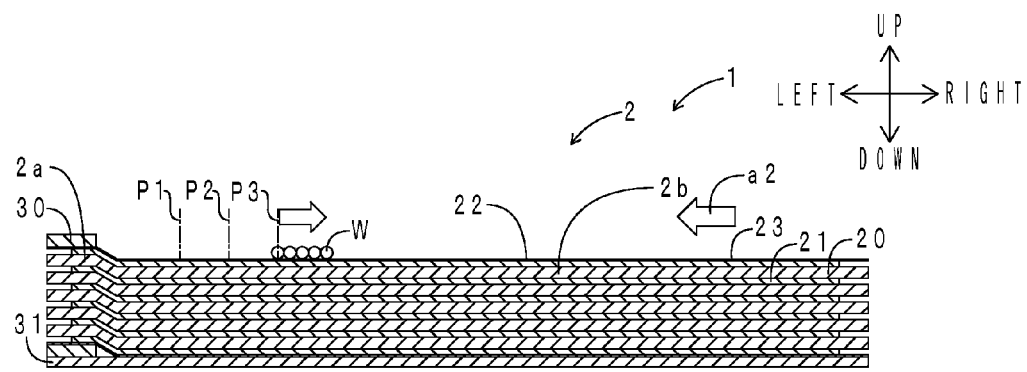
FIG. 4D is a sectional view taken in the left-right direction, showing an extended state (second extended state) of the conveying apparatus.

Movement of the conveying apparatus of the present embodiment will be described below. FIG. 4A is a sectional view taken in the left-right direction, showing a contracted state (first contracted state) of the conveying apparatus of the present embodiment. FIG. 4B is a sectional view taken in the left-right direction, showing an extended state (first extended state) of the conveying apparatus of the present embodiment. FIG. 4C is a sectional view taken in the left-right direction, showing a contracted state (second contracted state) of the conveying apparatus of the present embodiment. FIG. 4D is a sectional view taken in the left-right direction, showing an extended state (second extended state) of the conveying apparatus of the present embodiment. For convenience of description, the thickness in the up-down direction of the conveying apparatus is shown exaggerated in FIGS. 4A to 4D. FIG. 4A corresponds to point A in FIG. 3, FIG. 4B corresponds to point B in FIG. 3, FIG. 4C corresponds to point C in FIG. 3, and FIG. 4D corresponds to point D in FIG. 3.

As described above, the base portion 2a of the conveying member 2 is fixed to the backing member 31 via the restraining member 30. Accordingly, if a voltage is applied to the conveying member 2, the conveying portion 2b repeatedly switches between the contracted state shown in FIGS. 4A and 4C and the extended state shown in FIGS. 4B and 4D with the base portion 2a as a starting point. That is, the conveying portion 2b vibrates according to the frequency of the voltage shown in FIG. 3.

(Movement of Conveying Apparatus when Switching from Contracted State to Extended State)

First, movement of the conveying portion 2b when the conveying portion 2b switches from the contracted state shown in FIGS. 4A and 4C to the extended state shown in FIGS. 4B and 4D will be described. In the contracted state shown in FIGS. 4A and 4C, a voltage of the minimum value Vmin is applied to the conveying portion 2b as shown by points A, C in FIG. 3. A minimum electrostatic attractive force is therefore applied between each pair of electrode layers 21 adjacent to each other in the up-down direction. Accordingly, the conveying portion 2b is extended to the maximum in the up-down direction and contracted to the maximum in the horizontal direction by an elastic restoring force of the five dielectric layers 20 and the six electrode layers 21.

As the voltage applied to the conveying portion 2b increases as shown from point A to point B or from point C to point D in FIG. 3, the electrostatic attractive force between each pair of electrode layers 21 adjacent to each other in the up-down direction increases accordingly. The conveying portion 2b is therefore contracted in the up-down direction and extended in the horizontal direction against the overall elastic restoring force of the five dielectric layers 20 and the six electrode layers 21, as shown from FIG. 4A to FIG. 4B and from FIG. 4C to FIG. 4D. As shown in FIG. 1, the total length of the conveying path 22 in the left-right direction is longer than that of the conveying path 22 in the front-rear direction. The amount of extension of the conveying path 22 is therefore larger in the left-right direction than in the front-rear direction.

In the extended state shown in FIGS. 4B and 4D, a voltage of the maximum value Vmax is applied to the conveying portion 2b as shown by points B, D in FIG. 3. A maximum electrostatic attractive force is therefore applied between each pair of electrode layers 21 adjacent to each other in the up-down direction. Accordingly, the conveying portion 2b is contracted to the maximum in the up-down direction and extended to the maximum in the horizontal direction. In the extended state, the overall elastic restoring force of the five dielectric layers 20 and the six electrode layers 21 is accumulated in the conveying portion 2b. The conveying portion 2b switches from the contracted state to the extended state in this manner.

(Movement of Conveying Apparatus when Switching from Extended State to Contracted State)

Next, movement of the conveying portion 2b when the conveying portion 2b switches from the extended state shown in FIG. 4B to the extended state shown in FIG. 4C will be described. As the voltage applied to the conveying portion 2b decreases as shown from point B to point C in FIG. 3, the electrostatic attractive force between each pair of electrode layers 21 adjacent to each other in the up-down direction decreases accordingly. The conveying portion 2b is therefore extended in the up-down direction and contracted in the horizontal direction by the overall elastic restoring force of the five dielectric layers 20 and the six electrode layers 21 as shown from FIG. 4B to FIG. 4C. As shown in FIG. 1, the total length of the conveying path 22 in the left-right direction is longer than that of the conveying path 22 in the front-rear direction. The amount of contraction of the conveying path 22 is therefore larger in the left-right direction than in the front-rear direction. The conveying portion 2b switches from the extended state to the contracted state in this manner.

(Relationship Between Extension Acceleration and Contraction Acceleration)

The relationship between extension acceleration and contraction acceleration will be described below. Extension acceleration a1 refers to acceleration of deformation of the conveying path 22 in the left-right direction when the conveying path 22 switches from the contracted state shown in FIGS. 4A and 4C to the extended state shown in FIGS. 4B and 4D. Contraction acceleration a2 refers to acceleration of deformation of the conveying path 22 in the left-right direction when the conveying path 22 switches from the extended state shown in FIG. 4B to the contracted state shown in FIG. 4C. The relationship of extension acceleration a1<contraction acceleration a2 is satisfied in the present embodiment. The conveying path 22 therefore slowly switches from the contracted state to the extended state and quickly switches from the extended state to the contracted state.

For example, the acceleration of deformation of the conveying path 22 can be calculated from acceleration of movement in the left-right direction of any point on the conveying path 22 at the time the conveying path 22 switches from the contracted state to the extended state or from the extended state to the contracted state.

(Movement of Object to be Transported)

Movement of an object W to be transported by the conveying apparatus of the present embodiment will be described. As shown in FIGS. 4A to 4D, the object W to be transported moves from left to right on the conveying path 22 according to the change in voltage shown in FIG. 3.

When switching from the contracted state to the extended state as shown from FIG. 4A to FIG. 4B, the conveying path 22 is extended to the right with the base portion 2a as a starting point. The extension acceleration a1 of the conveying path 22 is low at the time the conveying path 22 switches from the contracted state to the extended state. The object W is therefore less likely to be shifted in the left-right direction with respect to the conveying path 22. Accordingly, the object W moves to the right from position P1 to position P2 as the conveying path 22 is extended.

When switching from the extended state to the contracted state as shown from FIG. 4B to FIG. 4C, the conveying path 22 is contracted to the left with the base portion 2a as a starting point. The contraction acceleration a2 of the conveying path 22 is high at the time the conveying path 22 switches from the extended state to the contracted state. The object W therefore tends to be shifted in the left-right direction with respect to the conveying path 22. In addition, when switching from the extended state to the contracted state, the conveying portion 2b is extended in the up-down direction by the elastic restoring force. The object W therefore tends to bounce upward from the conveying path 22. In this regard as well, the object W tends to be shifted in the left-right direction with respect to the conveying path 22. The object W therefore does not move back from position P2 to position P1 even through the conveying path 22 is contracted. The object W stays at position P2.

When the conveying path 22 switches again from the contracted state to the extended state as shown from FIG. 4C to FIG. 4D, the object W moves to the right from position P2 to position P3 as the conveying path 22 is extended, as in the case from FIG. 4A to FIG. 4B.

As described above, the object W moves little by little from left to right on the conveying path 22 as the conveying portion 2b repeatedly switches between the contracted state and the extended state. That is, the object W is moved by a predetermined pitch (=P2−P1=P3−P2) when the conveying portion 2b switches from the contracted state to the extended state. The object W stops when the conveying portion 2b switches from the extended state to the contracted state.

[Functions and Effects]

Functions and effects of the conveying apparatus of the present embodiment will be described below. According to the conveying apparatus 1 of the present embodiment, the conveying portion 2b can repeatedly switch between the extended state shown in FIGS. 4B and 4D and the contracted state shown in FIGS. 4A and 4C with the base portion 2a as a starting point. In other words, the conveying portion 2b can vibrate with the base portion 2a as a starting point. The conveying portion 2b can transport the object W on the conveying path 22 by this vibration.

According to the conveying apparatus 1 of the present embodiment, a multiplicity of electrodes need not be placed along the conveying path 22 along the entire length of the conveying path 22. An AC voltage need not be applied to the multiplicity of electrodes so that the object W can be transported. The conveying apparatus 1 of the present embodiment therefore has simple mechanical and electrical configurations. Moreover, the conveying apparatus 1 of the present embodiment can transport the object W regardless of electrical characteristics (conductive properties, insulating properties, etc.) of the object W.

In typical vibrating conveyors, a hard (e.g., steel) trough having the conveying path 22 is vibrated by a multiplicity of coil springs. The trough itself is not elastically deformed. In the conveying apparatus 1 of the present embodiment, the dielectric layers 20 are made of a flexible (low Young's modulus) elastomer. The dielectric layers 20 can therefore absorb the impact of the vibration of the conveying portion 2b on the object W. Accordingly, the object W is less likely to be damaged by the vibration of the conveying portion 2b when the object W is being transported.

According to the conveying apparatus 1 of the present embodiment, the relationship of extension acceleration a1<contraction acceleration a2 is satisfied regarding acceleration of deformation in the left-right direction of the conveying path 22. The conveying portion 2b therefore slowly switches from the contracted state to the extended state and quickly switches from the extended state to the contracted state. The conveying direction of the object W can thus be controlled to the direction from left to right.

According to the conveying apparatus 1 of the present embodiment, as shown in FIGS. 4A to 4D, the base portion 2a connects to the left end of the conveying portion 2b. The conveying portion 2b can therefore be vibrated along the entire length in the left-right direction of the conveying path 22 with the base portion 2a as a starting point. This can increase the distance by which the object W is transported in one stroke (from the contracted state through the extended state to the contracted state).

According to the conveying apparatus 1 of the present embodiment, as shown in FIG. 3, the DC voltage and the AC voltage can be applied to the conveying member 2 so as to be superimposed on each other. Accordingly, the AC voltage (the voltage that changes periodically with time) can be applied to the conveying member 2 based on a predetermined bias voltage.

According to the conveying apparatus 1 of the present embodiment, as shown in FIGS. 1 and 2, a part of the conveying member 2 is restrained by the restraining member 30, whereby the conveying member 2 can be divided into the base portion 2a and the conveying portion 2b. That is, a part of the conveying member 2 is restrained by the restraining member 30, whereby the base portion 2a can be set in the part of the conveying member 2, and the conveying portion 2b can be set in the remaining part of the conveying member 2 (the part that is not restrained by the restraining member 30). As shown in FIGS. 4A to 4D, elastic deformation and positional shifting of the base portion 2a can be suppressed even when the conveying portion 2b vibrates.

The base portion 2a includes the left edges of the electrode layers 21. The connectors 32 are disposed on the left side of the base portion 2a (the opposite side of the base portion 2b from the conveying portion 2b). As shown in FIGS. 4A to 4D, the electrode layers 21 are less likely to be electrically disconnected from the connectors 32 even when the conveying portion 2b vibrates.

As shown in FIG. 1, the total length in the left-right direction of the conveying path 22 of the conveying apparatus 1 of the present embodiment is larger than that in the front-rear direction of the conveying path 22. The amount of extension/contraction of the conveying path 22 is therefore larger in the left-right direction than in the front-rear direction. This can increase the distance by which the object W is transported in one stroke (from the contracted state through the extended state to the contracted state) as compared to the case where the conveying direction is the front-rear direction.

As shown in FIG. 2, the conveying apparatus 1 of the present embodiment includes the pair of upper and lower protective layers 23. The protective layers 23 are made of IIR and are flexible. According to the conveying apparatus 1 of the present embodiment, the uppermost and lowermost electrode layers 21 can therefore be protected from the outside. The protective layers 23 have insulating properties. According to the conveying apparatus 1 of the present embodiment, the uppermost and lowermost electrode layers 21 can thus be electrically insulated from the outside.

As shown in FIGS. 4A to 4D, the conveying apparatus 1 of the present embodiment includes the backing member 31. The conveying portion 2b can therefore slide-contact the backing member 31 when elastically deformed. The backing member 31 is made of a hard acrylic resin. This can reduce frictional resistance that is caused when the conveying portion 2b slide-contacts the backing member 31, as compared to the case where the backing member 31 is made of an elastomer. Elastic deformation of the conveying portion 2b is less likely to be restricted by the backing member 31.

Second Embodiment

Figure 5:
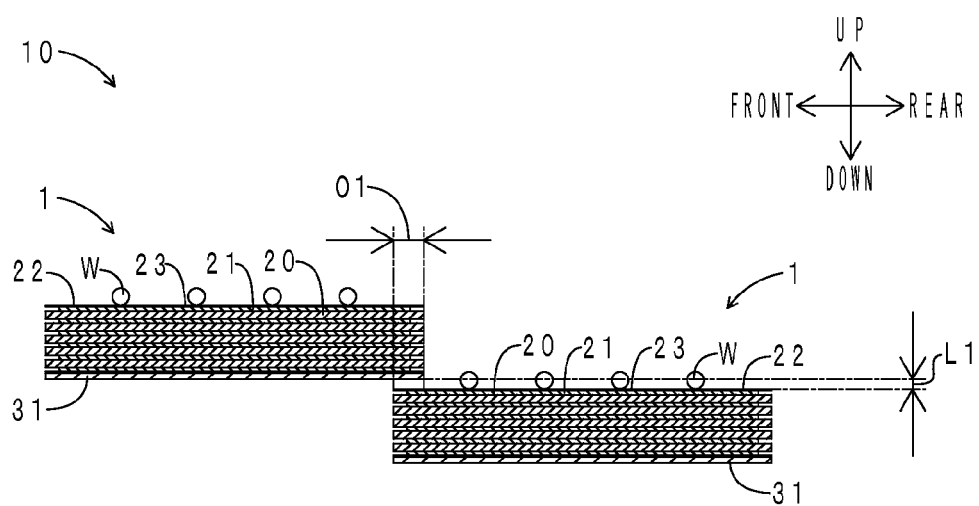
FIG. 5 is a sectional view of a conveying apparatus of a second embodiment taken in the front-rear direction.

A conveying apparatus of the present embodiment is different from that of the first embodiment in that two conveying apparatuses are arranged next to each other in the front-rear direction. Only the difference will be described below. FIG. 5 is a sectional view of the conveying apparatus of the present embodiment taken in the front-rear direction. Those portions corresponding to FIG. 2 are denoted by the same reference characters.

As shown in FIG. 5, a conveying unit 10 includes two conveying apparatuses 1. The two conveying apparatuses 1 are arranged next to each other in the front-rear direction (lateral direction) so as to be shifted from each other in the up-down direction. There is a difference in level between two conveying paths 22. An overlapping portion O1 is located between the two conveying apparatuses 1. In the overlapping portion O1, the rear edge of the front conveying apparatus 1 overlaps the front edge of the rear conveying apparatus 1 as viewed from above. Clearance L1 in the up-down direction in the overlapping portion O1 is smaller than the diameter of an object W to be transported. The object W is therefore less likely to drop from the overlapping portion O1.

The conveying apparatus of the present embodiment and the conveying apparatus of the first embodiment have similar functions and effects regarding those portions having the same configuration. The two conveying apparatuses 1 are arranged next to each other in the front-rear direction. This can increase the amount by which the object W is transported per unit time.

Third Embodiment

Figure 6:
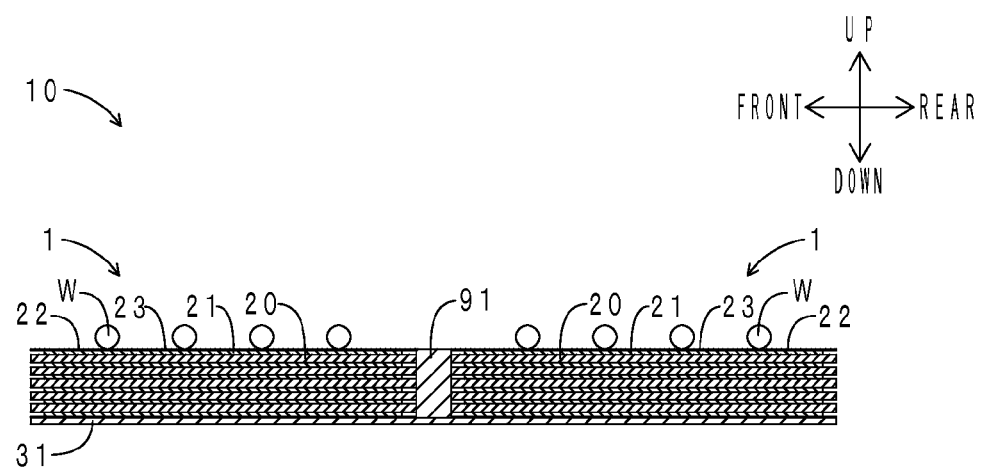
FIG. 6 is a sectional view of a conveying apparatus of a third embodiment taken in the front-rear direction.

A conveying apparatus of the present embodiment is different from that of the second embodiment in that a cushioning member is interposed between two conveying apparatuses. Only the difference will be described below. FIG. 6 is a sectional view of the conveying apparatus of the present embodiment taken in the front-rear direction. Those portions corresponding to FIG. 5 are denoted by the same reference characters.

As shown in FIG. 6, two conveying apparatuses 1 are arranged next to each other in the front-rear direction (lateral direction). There is no difference in level between two conveying paths 22. A cushioning member 91 made of a foamed elastomer is interposed between the two conveying apparatuses 1. The cushioning member 91 is in the form of sponge. The cushioning member 91 is flexible and has insulating properties. The spring constant in the front-rear direction of the cushioning member 91 is smaller than that in the front-rear direction of the conveying apparatus 1.

The conveying apparatus of the present embodiment and the conveying apparatus of the second embodiment have similar functions and effects regarding those portions having the same configuration. According to the conveying apparatus 1 of the present embodiment, the flexible cushioning member 91 is interposed between the two conveying apparatuses 1. Accordingly, the cushioning member 91 can absorb elastic deformation in the front-rear direction when the conveying apparatus 1 switches from the contracted state (see FIGS. 4A and 4C) to the extended state (see FIGS. 4B and 4D). Elastic deformation of one of the conveying apparatuses 1 is therefore less likely to hinder elastic deformation of the other conveying apparatus 1 between the two conveying apparatuses 1. The two conveying apparatuses 1 can therefore be driven independently.

Fourth Embodiment

Figure 7:
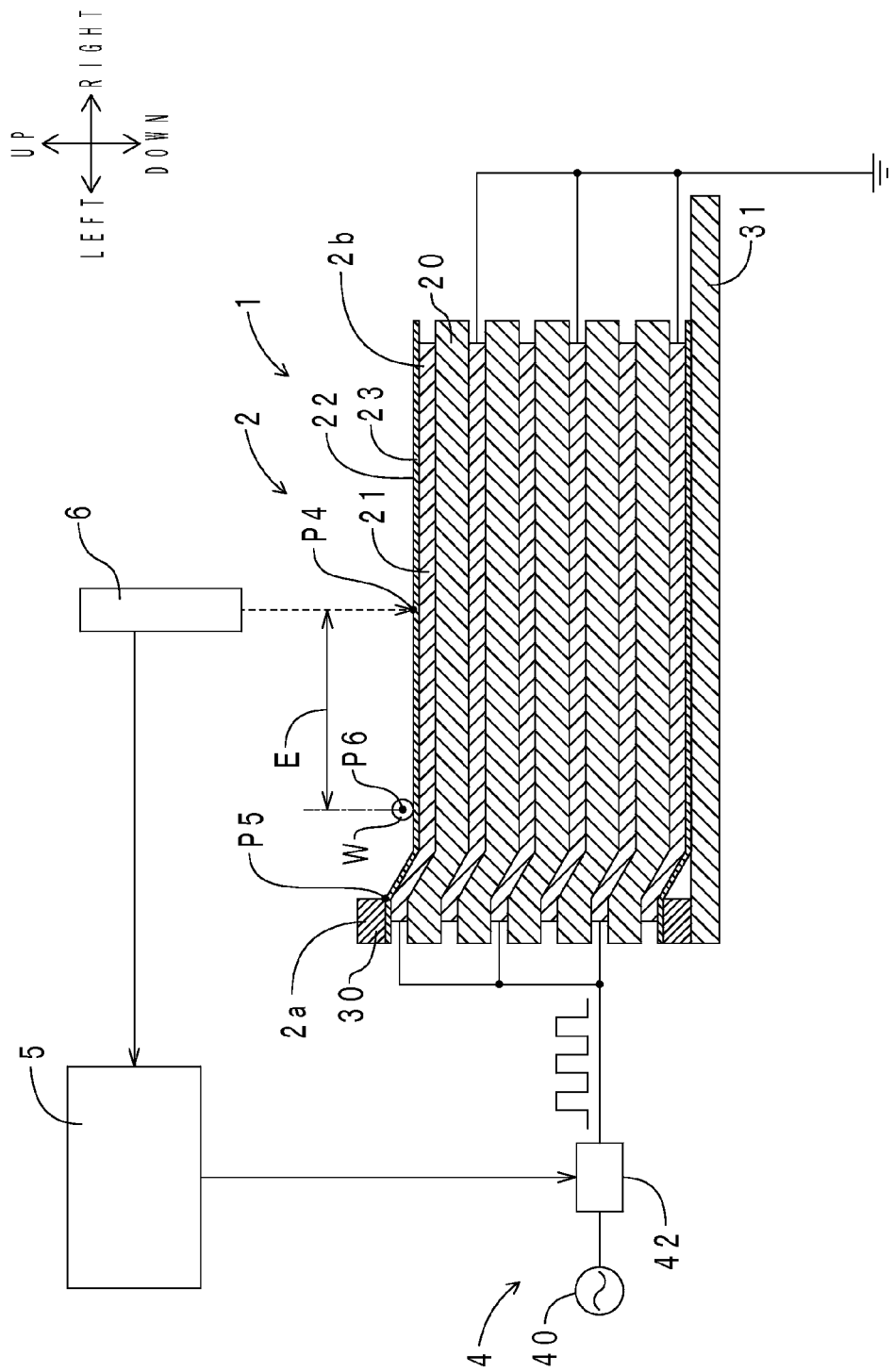
FIG. 7 is a sectional view of a conveying apparatus of a fourth embodiment taken in the left-right direction.

A conveying apparatus of the present embodiment is different from that of the first embodiment in that a control unit and a displacement sensor are provided. Only the difference will be described below. FIG. 7 is a sectional view of the conveying apparatus of the present embodiment taken along the front-rear direction. Those portions corresponding to FIG. 2 are denoted by the same reference characters.

As shown in FIG. 7, a conveying apparatus 1 includes a control unit 5 and a displacement sensor 6. A power supply unit 4 includes an AC power supply 40 and a waveform adjustment unit 42. The displacement sensor 6 is included in the concept of the "detection unit" of the present invention. The displacement sensor 6, the control unit 5, and the waveform adjustment unit 42 are electrically connected to each other. A detection position P4 is set on a conveying path 22. The displacement sensor 6 detects displacement of the detection position P4 which is associated with extension and contraction of a conveying portion 2b. The control unit 5 controls the waveform adjustment unit 42 based on the detection value of the displacement sensor 6, namely displacement of the detection position P4. The waveform adjustment unit 42 adjusts the frequency, waveform, maximum value Vmax, minimum value Vmin, etc. of an AC voltage that is supplied from the AC power supply 40.

The conveying apparatus of the present embodiment and the conveying apparatus of the first embodiment have similar functions and effects regarding those portions having the same configuration. According to the conveying apparatus 1 of the present embodiment, the voltage can be adjusted by the waveform adjustment unit 42 according to the conveying speed and the properties (volume, mass, shape, etc.) of an object W to be transported.

For example, in the case where the AC voltage has a sinusoidal waveform, the waveform adjustment unit 42 can generate pulse waves (solitary waves) from the AC voltage. The waveform adjustment unit 42 can also adjust the pulse width or the period of the pulse waves based on the detection value of the displacement sensor 6, namely displacement of the detection position P4. That is, the waveform adjustment unit 42 can adjust the interval between each pair of pulse waves that are located next to each other in chronological order. Specifically, the control unit 5 can use the displacement sensor 6 to check if contraction of the conveying portion 2b has been completed at the time the conveying portion 2b switches from the extended state shown in FIG. 4B to the contracted state shown in FIG. 4C (a voltage of 0 V in the case where the voltage shown in FIG. 3 has a pulse waveform). After verifying that contraction of the conveying portion 2b has been completed, the control unit 5 can use the waveform adjustment unit 42 to start extending the conveying portion 2b (switching the conveying portion 2b from the contracted state shown in FIG. 4C to the extended state shown in FIG. 4D). This can reduce the frequency of the voltage shown in FIG. 3 while maintaining a similar conveying speed, as compared to the case where the conveying portion 2b starts being extended before contraction of the conveying portion 2b is completed.

Fifth Embodiment

Figure 8:
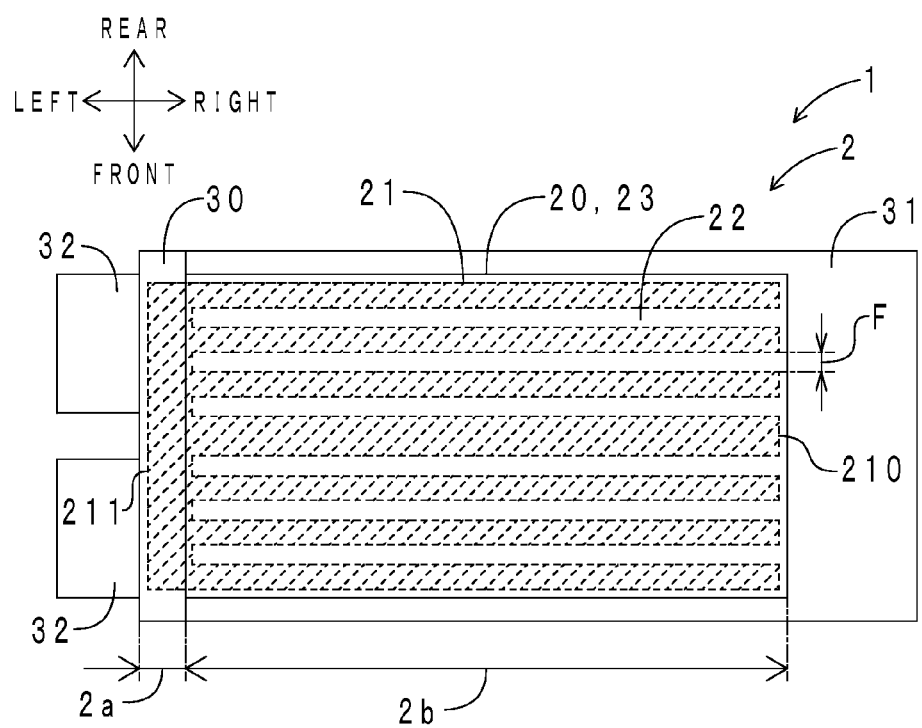
FIG. 8 is a top view of a conveying apparatus of a fifth embodiment.

A conveying apparatus of the present embodiment is different from that of the first embodiment in that each electrode layer includes a plurality of strip portions. Only the difference will be described below. FIG. 8 is a top view of the conveying apparatus of the present embodiment. Those portions corresponding to FIG. 1 are denoted by the same reference characters.

As transparently shown in FIG. 8, each of a total of six electrode layers 21 includes seven strip portions 210 and a joint portion 211. The seven strip portions 210 extend in the left-right direction (conveying direction). The seven strip portions 210 are arranged parallel to each other in the front-rear direction (lateral direction). The joint portion 211 extends in the front-rear direction. The joint portion 211 connects the left ends (upstream ends in the conveying direction) of the seven strip portions 210 in the front-rear direction. The joint portion 211 is restrained by a restraining member 30 in the up-down direction. Clearance F is provided between each pair of strip portions 210 adjacent to each other in the front-rear direction.

The conveying apparatus of the present embodiment and the conveying apparatus of the first embodiment have similar functions and effects regarding those portions having the same configuration. According to the conveying apparatus 1 of the present embodiment, the clearance F is provided between each pair of strip portions 210 adjacent to each other in the front-rear direction. This can reduce the area (areas of the upper and lower surfaces) of the electrode layers 21 as compared to the case where the clearance F is not provided, and can therefore reduce a current value required to drive the conveying portion 2b while ensuring a similar or higher conveying speed as compared to the case where the clearance F is not provided. According to the conveying apparatus 1 of the present embodiment, each pair of strip portions 210 adjacent to each other in the front-rear direction is less likely to restrict extension and contraction of each other's strip portion 210. The seven strip portions 210 are therefore easily extended and contracted in the left-right direction.

<Others>

The embodiments of the conveying apparatus of the present invention are described above. However, embodiments are not particularly limited to the above embodiments. The present invention can be embodied in various modified or improved forms that can be implemented by those skilled in the art.

Figure 9:
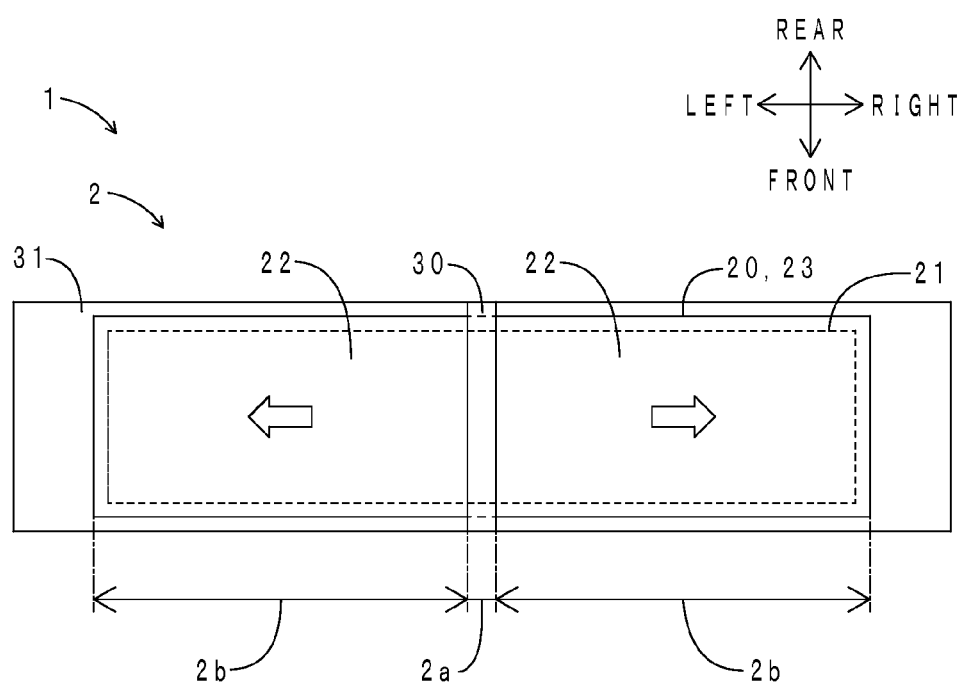
FIG. 9 is a top view of a conveying apparatus of a further embodiment (first further embodiment).

FIG. 9 is a top view of a conveying apparatus according to a further embodiment (first further embodiment). Those portions corresponding to FIG. 1 are denoted by the same reference characters. As shown in FIG. 9, two conveying portions 2b, namely right and left conveying portions 2b, may be disposed on both sides of a base portion 2a. The left conveying portion 2b can be extended to the left with the base portion 2a as a starting point. The right conveying portion 2b can be extended to the right with the base portion 2a as a starting point. According to the conveying apparatus 1 of the present embodiment, an object to be transported can be transported both in the right and left directions.

Figure 10:
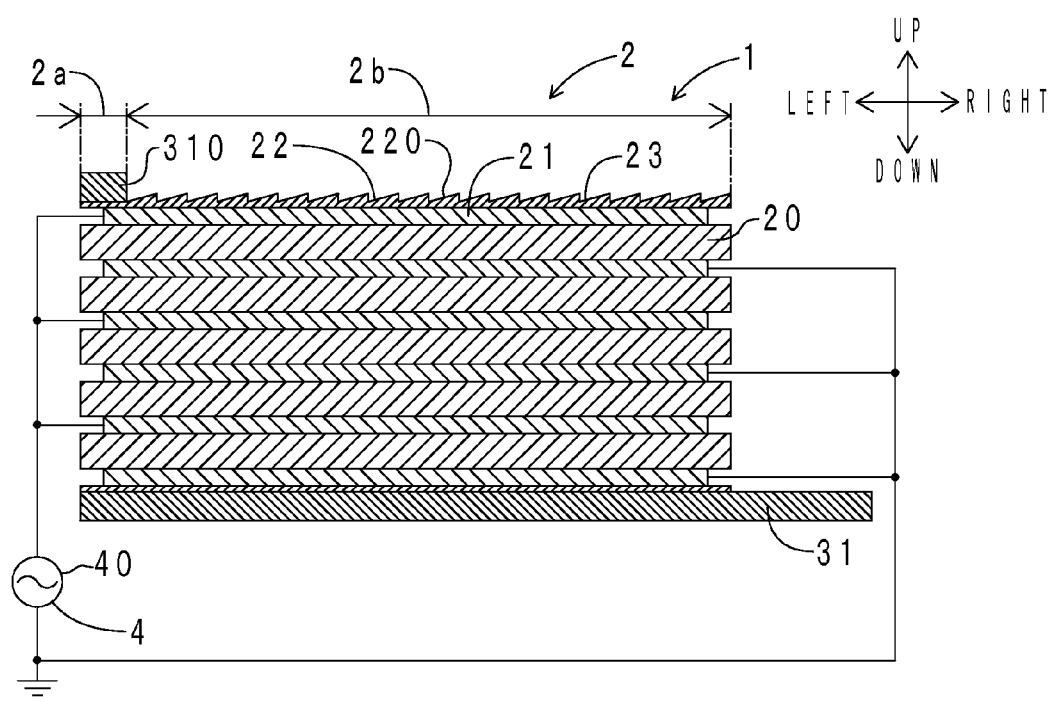
FIG. 10 is a sectional view of a conveying apparatus of a further embodiment (second further embodiment) taken in the left-right direction.

FIG. 10 is a sectional view of a conveying apparatus according to a further embodiment (second further embodiment) taken in the left-right direction. Those portions corresponding to FIG. 2 are denoted by the same reference characters. As shown in FIG. 10, a backing member 31 that also serves as a restraining member may be provided. That is, the backing member 31 having a restraining portion 310 at its left end may be provided. This reduces the number of parts. Only an AC power supply 40 may be provided in the power supply unit 4. This simplifies the electrical circuit configuration. Ribs 220 extending in the front-rear direction may be provided on the conveying path 22 so as to be arranged next to each other in the left-right direction. The right slopes (downstream-side slopes) of the ribs 220 are steeper than the left slopes (upstream-side slopes) thereof. The object is less likely to be shifted with respect to the conveying path 22 when the conveying apparatus 1 switches from the contracted state (see FIGS. 4A and 4C) to the extended state (see FIGS. 4B and 4D). The object tends to be shifted with respect to the conveying path 22 when the conveying apparatus 1 switches from the extended state to the contracted state.

The type of the restraining member 30 shown in FIGS. 1 and 2 is not particularly limited. The restraining member 30 need only restrict deformation and positional shifting of the base portion 2a. For example, a fastening member such as a bolt and a nut or a screw, an engagement member such as a clip, a binding member such as a band or tape, or a fixing member such as an adhesive or a stapler may be used as the restraining member 30.

The conveying apparatus 1 may not include the restraining member 30. The conveying apparatus 1 need only be able to restrict deformation or positional shifting of the base portion 2a. For example, the mass (weight) of the base portion 2a is made significantly larger than that of the conveying portion 2b, or the friction coefficient of the lower surface of the base portion 2a is made significantly larger than that of the lower surface of the conveying portion 2b. A tensile force may be applied to the base portion 2a from both sides in the front-rear direction (lateral direction). The base portion 2a may be set by bonding the left edge of the lower protective layer 23 to the backing member 31. The conveying apparatus 1 may not include the upper and lower protective layers 23 and the backing member 31.

The conveying direction on the conveying path 22 is not particularly limited. In the case where the conveying direction is one direction, the conveying direction may be either the direction away from the base portion 2a or the direction toward the base portion 2a. The conveying direction may be able to be switched. That is, the conveying direction may be switched between the direction away from the base portion 2a and the direction toward the base portion 2a.

The conveying path 22 may be tilted. The direction in which the conveying path 22 is tilted is not particularly limited. For example, the conveying path 22 may be tilted upward from the upstream side toward the downstream side. Alternatively, the conveying path 22 may be tilted downward from the upstream side toward the downstream side.

In order to control the conveying direction, the acceleration of deformation of the conveying path 22 varies between when the conveying path 22 switches from the contracted state (FIGS. 4A and 4C) to the extended state (FIGS. 4B and 4D) and when the conveying path 22 switches from the extended state to the contracted state. In the case where extension acceleration a1>contraction acceleration a2, the object W to be transported moves mainly when the conveying path 22 switches from the extended state to the contracted state. The object W therefore tends to move in the direction toward the base portion 2a. In the case where extension acceleration a1<contraction acceleration a2, the object W moves mainly when the conveying path 22 switches from the contracted state to the extended state. The object W therefore tends to move in the direction away from the base portion 2a.

For example, the acceleration of deformation (the extension acceleration a1 and the contraction acceleration a2) can be controlled by adjusting the frequency, waveform, maximum value Vmax, and minimum value Vmin of the AC voltage and the voltage value of the DC voltage Vdc shown in FIG. 3, the Young's modulus of the conveying portion 2b shown in FIG. 2, the number of stacked layers (the electrode layer 21, the dielectric layer 20, and the electrode layer 21) in the conveying portion 2b, and so forth. The conveying speed can be controlled similarly.

The number of stacked layers (the electrode layer 21, the dielectric layer 20, and the electrode layer 21) in the conveying portion 2b is not particularly limited. Increasing the number of stacked layers can increase the distance by which the object W is transported in one stroke (from the contracted state through the extended state to the contracted state).

A method for disposing the electrode layer 21 on the dielectric layer 20 is not particularly limited. Methods such as bonding and printing may be used. A method for disposing the restraining member 30 on the backing member 31 is not particularly limited. The restraining member 30 may or may not be fixed to the backing member 31.

The waveform of the voltage shown in FIG. 3 is not particularly limited. The voltage may have a triangular waveform (e.g., an isosceles triangular waveform, a right triangular waveform, etc.), a sawtooth waveform, a rectangular waveform, a trapezoidal waveform, etc. The voltage may have a continuous waveform or a pulse waveform. The amplitude Vp of the AC voltage is desirably closer to the DC voltage Vdc. It is preferable that the amplitude Vp be equal to the DC voltage Vdc. This can increase the distance by which the object W is transported in one stroke (from the contracted state through the extended state to the contracted state).

The type of the displacement sensor 6 (detection unit) shown in FIG. 7 is not particularly limited. For example, the displacement sensor 6 may be a flexible elongation sensor or a flexible strain sensor. The flexible elongation sensor or the flexible strain sensor may be contained in the conveying portion 2b. The flexible elongation sensor or the flexible strain sensor may be placed independently of the conveying portion 2b. The AC power supply 40 shown in FIG. 7 may be replaced with a DC power supply. A predetermined waveform may be produced from a DC voltage by the waveform adjustment unit 42. The waveform adjustment unit 42 may be contained in the control unit 5, the AC power supply 40, or the DC power supply.

The material of the dielectric layers 20 is not particularly limited. The dielectric layers 20 need only be made of an elastomer. For example, it is preferable to use an elastomer having high permittivity. Specifically, it is preferable to use an elastomer having a dielectric constant (100 Hz) of 2 or more, and more preferably 5 or more, at normal temperature. For example, an elastomer having a polar functional group such as an ester group, a carboxyl group, a hydroxyl group, a halogen group, an amide group, a sulfone group, a urethane group, or a nitrile group, or an elastomer containing a polar low molecular weight compound having such a polar functional group is preferably used. Preferred elastomers other than H-NBR include silicone rubber, acrylonitrile-butadiene rubber (NBR), ethylene propylene diene rubber (EPDM), acrylic rubber, urethane rubber, epichlorohydrin rubber, chlorosulfonated polyethylene, chlorinated polyethylene, etc. The material of the protective layers 23 is not particularly limited. The material of the protective layers 23 may be similar to that of the dielectric layers 20.

The material of the electrode layers 21 is not particularly limited. For example, the electrode layers 21 may be made of silicone rubber, acrylic rubber, a flexible conductive material as N-NBR filled with silver powder or carbon. The electrode layers 21 may be made of a metal or a carbon material. In order to make the electrode layers 21 stretchable, the electrode layers 21 may be formed by weaving a metal etc. into a mesh pattern. The electrode layers 21 may be made of a conductive polymer such as polyethylenedioxythiophene (PEDOT). In the case of using a flexible conductive material containing a binder and a conductive material, it is preferable to use an elastomer as the binder. Preferred examples of the elastomer include silicone rubber, NBR, EPDM, natural rubber, styrene-butadiene rubber (SBR), acrylic rubber, urethane rubber, epichlorohydrin rubber, chlorosulfonated polyethylene, and chlorinated polyethylene. The conductive material is selected as appropriate from carbon materials such as carbon black, carbon nanotube, and graphite, metal materials such as silver, gold, copper, nickel, rhodium, palladium, chromium, titanium, platinum, iron, and alloys thereof, and conductive oxides such as indium tin oxide (ITO) and titanium oxide or zinc oxide doped with another metal such as aluminum or antimony. A single conductive material may be used solely, or a mixture of two or more conductive materials may be used. The material of the wire is not particularly limited. The material of the wire may be similar to that of the electrode layer 21.

The material of the restraining member 30 and the material of the backing member 31 are not particularly limited. The restraining member 30 and the backing member 31 need only be made of a resin or metal having higher Young's modulus than the elastomer of the dielectric layers 20. In order to reduce the frictional resistance that is caused when the conveying portion 2b slide-contacts the backing member 31, the surface of the backing member 31 may be coated with a lubricant (a release agent, oil, etc.). In order to reduce the contact area with the conveying portion 2b, the surface of the backing member 31 may have a protrusion or protrusions. The backing member 31 may be made of fluororesin.

The structure, material, etc. of the cushioning member 91 shown in FIG. 6 are not particularly limited. For example, the cushioning member 91 may be a solid member, a porous member (honeycomb structure, cardboard, etc.), a foam member (expanded polystyrene etc.), a hollow member, etc. In the case where the cushioning material 91 is a hollow member, the cushioning member 91 may be filled with gas, liquid, etc.

The kind of the object W to be transported is not particularly limited. It is preferable that the object W bounce when the conveying portion 2b switches from the extended state shown in FIG. 4B to the contracted state shown in FIG. 4C. In this regard, the object W may be powder (flour, salt, sugar, cosmetics, granules, etc.) or grains (tablets of medicine etc.) which have small mass.

The smaller the mass is, the larger the distance by which the object W is transported per unit stroke is. Based on this, the objects W may be sorted into a plurality of kinds by mass by the conveying apparatus 1 of the present embodiment.

EXAMPLES

Experiments that were conducted to examine preferred conveying conditions for the object to be transported will be described below.

<Samples>

Table 1 shows samples used in the experiments.

TABLE 1

| Samples | Size Conveying Direction [mm] × Lateral Direction [mm] | Number of Stacked Layers |
| --- | --- | --- |
| Example 1 | 130 × 35 | 5 |
| Example 2 | 130 × 70 | 5 |
| Example 3 | 240 × 70 | 5 |
| Example 4 | 130 × 70 | 1 |
| Example 5 | 130 × 70 | 3 |
| Example 6 | 130 × 70 | 9 |
| Example 7 | 130 × 70 | 11 |

As shown in Table 1, the samples used in the experiments are Examples 1 to 7. Example 2 is the conveying apparatus 1 of the first embodiment (see FIGS. 1 to 4). The materials and the thicknesses in the stacking direction of the dielectric layer 20, the electrode layer 21, the protective layer 23, the restraining member 30, and the backing member 31 are the same in Examples 1 to 7. Each of Examples 1 to 7 has a rectangular shape that is long in the conveying direction.

In Experiments 1 to 3 described below, the object W to be transported is flour. Unit particles of flour have an average particle size (diameter) of 56 μm. 2 g of flour was used. In Experiment 4 described below, the object W to be transported is salt (specifically, aggregate of salt particles). Salt particles have an average particle size (diameter) of 400 μm. 2 g of salt was used. In Experiment 5 described below, the object W to be transported is three tablets. Each tablet has a short columnar shape. Each tablet has a diameter of 15 mm and an axial length of 6 mm. The mass of each tablet is 1 g. The Experiments 1 to 4 were conducted with the object W placed near the middle of one end of the conveying portion 2b and flattened out with a spatula.

<Experiment 1>

The sample used in Experiment 1 is Example 2 in Table 1. The forward direction of the conveying direction on the conveying path 22 is the direction from left to right (the direction away from the base portion 2a) in FIGS. 1 to 4. In Experiment 1, the transport state of the object W by Example 2 was observed with various DC voltages Vdc and various AC voltages shown in FIG. 3. Table 2 shows the result of the experiment.

TABLE 2

| | | Vdc [V] | | | | | | | | |
| --- | --- | --- | --- | --- | --- | --- | --- | --- | --- | --- |
| | | 0 | 100 | 200 | 300 | 400 | 500 | 600 | 700 | 800 |
| Vpp [V] | 100 | Δ | Δ | Δ | Δ | Δ | Δ | Δ | Δ | Δ |
| | 200 | Δ | Δ | Δ | Δ | Δ | Δ | Δ | Δ | Δ |
| | 300 | Δ | Δ | Δ | Δ | Δ | Δ | Δ | Δ | ○ |
| | 400 | Δ | Δ | Δ | Δ | Δ | ○ | ○ | ○ | ○ |
| | 500 | Δ | Δ | Δ | ○ | ○ | ○ | ○ | ○ | ○ |
| | 600 | Δ | Δ | Δ | ○ | ○ | ○ | ○ | ○ | ○ |
| | 700 | Δ | Δ | Δ | Δ | ○ | ○ | ○ | ○ | ○ |
| | 800 | Δ | Δ | Δ | Δ | ○ | ○ | ○ | ○ | ○ |

In Table 2, "○" means that the conveying speed of the object W is high, and "Δ," means that the conveying speed of the object W is normal. As shown in Table 2, the object W can be transported even if only the AC voltage is applied (even if the DC voltage Vdc is not applied).

In the case where the peak-to-peak value Vpp in FIG. 3 is large, a large amount of Joule heat is generated from the conveying portion 2b. Accordingly, in order to suppress generation of Joule heat, it is preferable to reduce the peak-to-peak value Vpp (e.g., 400 V or less). However, reducing the peak-to-peak value Vpp degrades the transport state of the object W. Accordingly, it is desirable to increase the DC voltage Vdc (e.g., 500 V or higher) instead of reducing the peak-to-peak value Vpp.

Even when this experiment was conducted with a pile of object W placed near the middle of one end of the conveying portion 2b (with the object W not flattened out with a spatula), the object W was able to be transported as in Table 2 with the pile of the object W gradually crumbling down.

<Experiment 2>

The samples used in Experiment 2 are Examples 1 to 3 of Table 1. As shown in Table 1, Examples 1 to 3 are different from each other in size. The forward direction of the conveying direction of the conveying path 22 is the direction from left to right (the direction away from the base portion 2a) in FIGS. 1 to 4. The reverse direction of the conveying direction of the conveying path 22 is the direction from right to left (the direction toward the base portion 2a) in FIGS. 1 to 4.

In Experiment 2, the transport state of the object W by Examples 1 to 3 was observed at various frequencies of the AC voltage shown in FIG. 3 (various numbers of vibrations of the conveying portion 2b). The DC voltage Vdc shown in FIG. 3 was 350 V. The peak-to-peak value Vpp was 700 V (i.e., the amplitude Vp=350 V). Table 3 shows the result of the experiment.

of the object W is the forward direction and the conveying speed of the object W is normal, "-○" means that the conveying direction of the object W is the reverse direction and the conveying speed of the object W is high, "-Δ" means that the conveying direction of the object W is the reverse direction and the conveying speed of the object W is normal, and "x" means that the conveying speed of the object W is low.

As shown in Table 3, the frequency suitable for transporting the object W is different depending on the size of Examples 1 to 3. The object W can be transported not only in the forward direction but also in the reverse direction by adjusting the frequency.

An audible frequency range for humans is about 20 to 20,000 Hz. In this regard, as shown in Table 3, Examples 1 to 3 can be driven in a low frequency range of about 40 Hz to 100 Hz, namely in a low frequency range that can be hardly heard by humans. Examples 1 to 3 are therefore very quiet (low noise).

<Experiment 3>

The samples used in Experiment 3 are Examples 2 and 4 to 7 of Table 1. As shown in Table 1, Examples 2 and 4 to 7 are different from each other in the number of stacked layers. The number of stacked layers refers to the number of dielectric layers 20 in the case where the electrode layers 21 and the dielectric layers 20 are alternately stacked. For example, if the number of stacked layers is 9, this means that the number of dielectric layers 20 is 9 and the number of electrode layers 21 is 10.

In Experiment 3, as in Experiment 2, the transport state of the object W by Examples 2 and 4 to 7 was observed at various frequencies of the AC voltage shown in FIG. 3 (various numbers of vibrations of the conveying portion 2b). The DC voltage Vdc shown in FIG. 3 was 350 V. The peak-to-peak value Vpp was 700 V (i.e., the amplitude Vp=350 V). Table 4

TABLE 3

| Samples | Frequency [Hz] | | | | | | | | | | | | | |
|---|---|---|---|---|---|---|---|---|---|---|---|---|---|---|
| | 10 | 20 | 30 | 40 | 50 | 60 | 70 | 80 | 90 | 100 | 110 | 120 | 130 | 140 |
| Example 1 | x | x | x | Δ | ○ | ○ | ○ | ○ | ○ | ○ | ○ | ○ | Δ | Δ |
| Example 2 | x | x | x | ○ | ○ | ○ | ○ | ○ | ○ | -Δ | -Δ | -Δ | -Δ | -○ |
| Example 3 | x | x | ○ | ○ | ○ | ○ | Δ | -Δ | -Δ | -Δ | x | x | x | x |

| Samples | Frequency [Hz] | | | | | | | | | | |
|---|---|---|---|---|---|---|---|---|---|---|---|
| | 150 | 160 | 170 | 180 | 190 | 200 | 210 | 220 | 230 | 240 | 250 |
| Example 1 | x | -Δ | -Δ | x | x | x | -Δ | -Δ | x | x | x |
| Example 2 | -○ | -○ | -○ | -○ | -○ | -○ | -Δ | -Δ | x | x | x |
| Example 3 | x | x | x | x | x | x | x | x | x | x | x |

In Table 3, "○" means that the conveying direction of the object W is the forward direction and the conveying speed of the object W is high, "Δ" means that the conveying direction shows the result of the experiment. Definitions of the forward direction, the reverse direction, "○," "Δ," "-○," "-Δ," and "x" and are similar to Experiment 2.

TABLE 4

| Samples | Frequency [Hz] | | | | | | | | | | | | | |
|---|---|---|---|---|---|---|---|---|---|---|---|---|---|---|
| | 10 | 20 | 30 | 40 | 50 | 60 | 70 | 80 | 90 | 100 | 110 | 120 | 130 | 140 |
| Example 4 | x | x | x | Δ | Δ | Δ | x | x | x | x | x | x | x | x |

TABLE 4-continued

| Sample | | | | | | | | | | | | | | |
|---|---|---|---|---|---|---|---|---|---|---|---|---|---|---|
| Example 5 | x | x | x | Δ | Δ | Δ | x | x | x | x | x | x | x | x |
| Example 2 | x | x | x | o | o | o | o | o | o | -Δ | -Δ | -Δ | -Δ | -o |
| Example 6 | x | x | x | o | o | o | o | o | o | o | o | x | x | x |
| Example 7 | x | x | x | o | o | o | o | o | o | o | o | o | o | o |

| | Frequency [Hz] | | | | | | | | | | |
|---|---|---|---|---|---|---|---|---|---|---|---|
| Samples | 150 | 160 | 170 | 180 | 190 | 200 | 210 | 220 | 230 | 240 | 250 |
| Example 4 | x | x | x | x | x | x | x | x | x | x | x |
| Example 5 | x | x | x | x | x | x | x | x | x | x | x |
| Example 2 | -o | -o | -o | -o | -o | -o | -Δ | -Δ | x | x | x |
| Example 6 | x | x | x | x | x | x | x | x | x | x | x |
| Example 7 | o | o | Δ | Δ | x | x | x | x | x | x | x |

As shown in Table 4, the frequency suitable for transporting the object W is different depending on the number of stacked layers of Examples 2 and 4 to 7. The object W can be transported not only in the forward direction but also in the reverse direction by adjusting the frequency.

An audible frequency range for humans is about 20 to 20,000 Hz. In this regard, as shown in Table 4, Examples 2 and 4 to 7 can be driven in a low frequency range of about 40 Hz to 100 Hz, namely in a low frequency range that can be hardly heard by humans. Examples 2 and 4 to 7 are therefore very quiet (low noise).

<Experiment 4>

The sample used in Experiment 4 is Example 2 of Table 1. Experiment 4 is different from Experiment 1 only in the kind of the object W. In Experiment 4, salt rather than flour (Experiment 1) was used as the object W. Table 5 shows the result of the experiment.

TABLE 5

| | | Vdc[V] | | | | | | | |
|---|---|---|---|---|---|---|---|---|---|
| | | 100 | 200 | 300 | 400 | 500 | 600 | 700 | 800 |
| Vpp [V] | 100 | Δ | Δ | Δ | Δ | Δ | Δ | Δ | Δ |
| | 200 | Δ | Δ | Δ | Δ | Δ | Δ | Δ | Δ |
| | 300 | Δ | Δ | Δ | Δ | Δ | Δ | o | o |
| | 400 | Δ | Δ | Δ | o | o | o | o | o |
| | 500 | Δ | Δ | o | o | o | o | o | o |
| | 600 | Δ | Δ | o | o | o | o | o | o |
| | 700 | Δ | Δ | Δ | o | o | o | o | o |
| | 800 | Δ | Δ | Δ | o | o | o | o | o |

In Table 5, "O" means that the conveying speed of the object W is high, and "Δ" means that the conveying speed of the object W is normal. As shown in Table 5, the object W can be transported even if the object W is salt.

Even when this experiment was conducted with a pile of object W placed near the middle of one end of the conveying portion 2b (with the object W not flattened out with a spatula), the object W was able to be transported as in Table 5 with the pile of the object W gradually crumbling down.

<Experiment 5>

The sample used in Experiment 5 is Example 2 of Table 1. Experiment 5 is different from Experiment 1 only in the kind of the object W. In Experiment 5, tablets rather than flour (Experiment 1) were used as the object W. Table 6 shows the result of the experiment.

TABLE 6

| | | Vdc [V] | | | | | | | |
|---|---|---|---|---|---|---|---|---|---|
| | | 100 | 200 | 300 | 400 | 500 | 600 | 700 | 800 |
| Vpp [V] | 100 | Δ | Δ | Δ | Δ | Δ | Δ | Δ | Δ |
| | 200 | Δ | Δ | Δ | Δ | Δ | Δ | Δ | Δ |
| | 300 | Δ | Δ | Δ | Δ | o | o | o | o |
| | 400 | Δ | Δ | o | o | o | o | o | o |
| | 500 | Δ | Δ | o | o | o | o | o | o |
| | 600 | Δ | Δ | o | o | o | o | o | o |
| | 700 | Δ | Δ | Δ | o | o | o | o | o |
| | 800 | Δ | Δ | Δ | o | o | o | o | o |

In Table 6, "O" means that the conveying speed of the object W is high, and "Δ" means that the conveying speed of the object W is normal. As shown in Table 6, the object W can be transported even if the object W is tablets.

<Regarding Experiments 6 to 9>

The ordinate and the abscissa in FIGS. 11 to 24 regarding Experiments 6 to 9 are represented by arbitrary units. The graphs of the same kind can be compared to each other. That is, FIGS. 11, 13, 15 to 18, 20, and 22 in which the abscissa represents time and the ordinate represents voltage and position can be compared to each other. FIGS. 12, 14, 19, 21, and 24 in which the abscissa represents time and the ordinate represents distance can be compared to each other.

The "position" on the ordinate of FIGS. 11, 13, 15 to 18, 20, and 22 is the position in the conveying direction (left-right direction) of the detection position P4 that is set on the conveying path 22 as shown in FIG. 7. The base point (point 0) of the position is an upstream end (left end) P5 of the conveying path 22.

The "distance" on the ordinate of FIGS. 12, 14, 19, 21, and 24 is the distance E in the conveying direction between a position P6 of the object W and the detection position P4 as shown in FIG. 7. The distance E before transport is defined as "0." The experiments were shot with a high speed camera. The detection position P4, the position P6 of the object W, and the distance E were measured from the images of the high speed camera.

As shown in FIG. 7, the position P6 is set on the upstream side in the conveying direction of the detection position P4. Accordingly, in the case where the distance E changes in the positive direction from 0 as the object W is transported, this means that the object W has moved to the upstream side (in the reverse direction of the conveying direction). On the other hand, in the case where the distance E changes in the negative direction from 0 as the object W is transported, this means that the object W has moved to the downstream side (in the forward direction of the conveying direction). The object W is zirconia beads (specifically, aggregate of zirconia beads). The zirconia beads have an average particle size (diameter) of 300 μm.

<Experiment 6>

Figure 11:
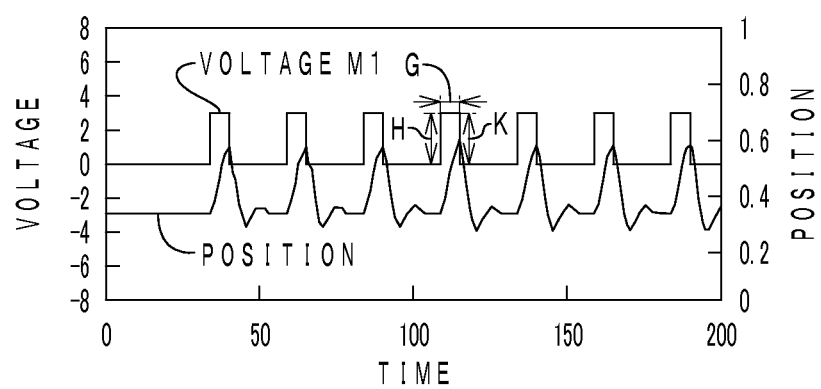
FIG. 11 is a graph showing a change in position with time in the case where a voltage has a rectangular waveform.
Figure 13:
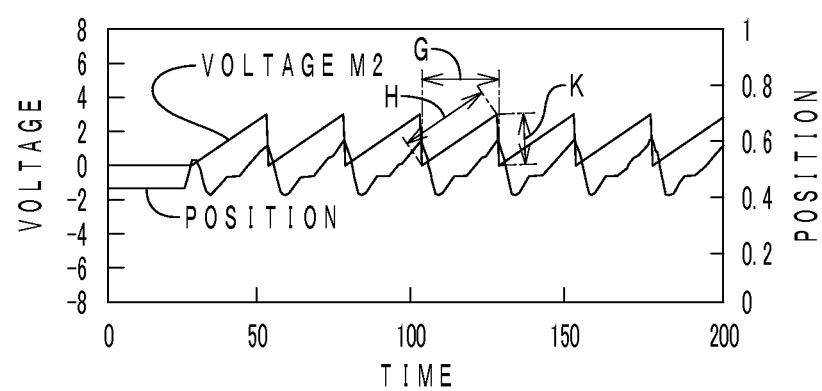
FIG. 13 is a graph showing a change in position with time in the case where a voltage has a right triangular waveform with a sharply increasing gradient to the right.
Figure 14:
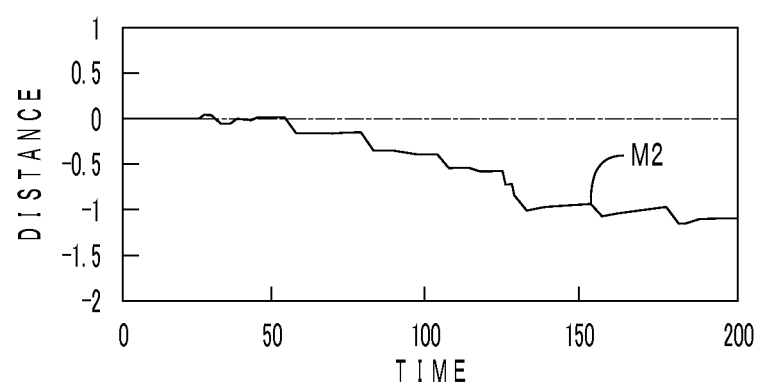
FIG. 14 is a graph showing a change in distance with time in the case of FIG. 13.

In Experiment 6, the difference in conveying speed depending on the type of waveform (rectangular waveform, triangular waveform) of the voltage (DC voltage whose polarity is not inverted) was examined. The sample used in Experiment 6 is Example 2 of Table 1. FIG. 11 shows a change in position with time in the case where the voltage has a rectangular waveform. FIG. 12 shows a change in distance with time in the case of FIG. 11. FIG. 13 shows a change in position with time in the case where the voltage has a right triangular waveform with a sharply increasing gradient to the right. FIG. 14 shows a change in distance with time in the case of FIG. 13. The voltage waveforms shown in FIGS. 11 and 13 were produced by the waveform adjustment unit 42 shown in FIG. 7.

[In the Case where the Voltage has a Rectangular Waveform]

First, an example in which the voltage has a rectangular waveform will be described. As shown in FIG. 11, a waveform G of a change in voltage M1 with time (a waveform for one period; the same applies to the following description) includes a boost section H and a step-down section K. In the boost section H, the voltage M1 switches from off to on. That is, the voltage M1 increases with time. The conveying portion 2b is extended in the conveying direction according to the boost section H. The detection position P4 is therefore displaced to the downstream side. A time differential value (gradient) of the voltage M1 in the boost section H corresponds to the extension acceleration of the conveying portion 2b. The larger the absolute value of the time differential value is, the larger the extension acceleration of the conveying portion 2b is. In the step-down section K, the voltage M1 switches from on to off. That is, the voltage M1 decreases with time. The conveying portion 2b is contracted in the conveying direction according to the step-down section K. The detection position P4 is therefore displaced to the upstream side. A time differential value (gradient) of the voltage M1 in the step-down section K corresponds to the contraction acceleration of the conveying portion 2b. The larger the absolute value of the time differential value is, the larger the contraction acceleration of the conveying portion 2b is. In the case where the waveform G is a rectangular waveform, the absolute value of the time differential value of the voltage M1 in the boost section H is the same as that of the time differential value of the voltage M1 in the step-down section K.

As shown in FIG. 12, in the case where the waveform G is a rectangular waveform, the distance E (specifically, the distance E in the conveying direction between the position P6 of the object W and the detection position P4) shown in FIG. 7 changes in the negative direction from 0. That is, in the case where the waveform G is a rectangular waveform, the object W can be transported to the downstream side.

However, in the case where the waveform G is a rectangular waveform, there are a plurality of sections where the distance E changes in the positive direction, as shown by hatched areas in FIG. 12. That is, there are a plurality of sections where the object W moves to the upstream side (reverse movement sections).

[In the Case where the Voltage has a Triangular Waveform]

An example in which the voltage has a right triangular waveform with a sharply increasing gradient to the right (a later point in time) will be described. As shown in FIG. 13, a waveform G, for one period, of a change in voltage M2 with time includes a boost section H and a step-down section K. The absolute value of a time differential value of the voltage M2 in the boost section H is smaller than that of the time differential value of the voltage M2 in the step-down section K.

As shown in FIG. 14, the distance E shown in FIG. 7 (specifically, the distance E in the conveying direction between the position P6 of the object W and the detection position P4) changes in the negative direction from 0. That is, in the case where the waveform G is a right triangular waveform with a sharply increasing gradient to the right, the object W can be transported to the downstream side.

The absolute value of the time differential value of the voltage M2 in the boost section H is smaller than that of the time differential value of the voltage M2 in the step-down section K. Accordingly, the conveying portion 2b is slowly extended and quickly contracted. The object W is therefore less likely to be shifted with respect to the conveying path 22 when the conveying portion 2b is extended. The object W thus tends to move to the downstream side according to extension of the conveying path 22. Moreover, the object W tends to be shifted with respect to the conveying path 22 when the conveying path 22 is contracted. The object W is therefore less likely to move according to contraction of the conveying path 22.

As described above, in the case where the absolute value of the time differential value of the voltage M2 in the boost section H is smaller than that of the time differential value of the voltage M2 in the step-down section K, the object W is less likely to move in the reverse direction as shown in FIG. 14. As shown in FIGS. 12 and 14, the conveying speed can be increased at the voltage M2 with respect to the voltage M1.

<Experiment 7>

Figure 16:
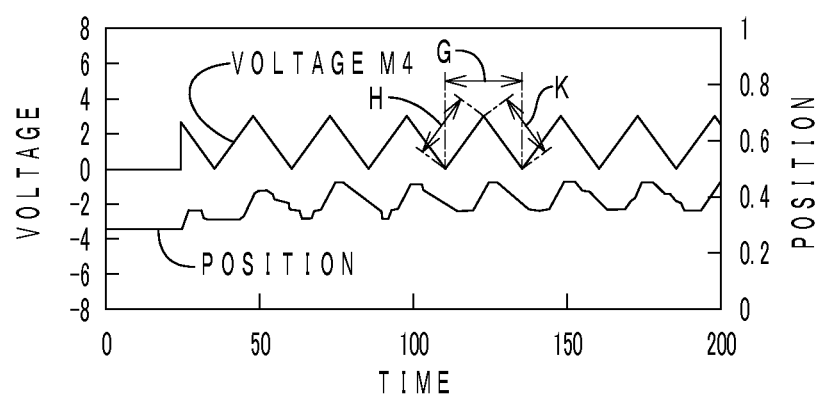
FIG. 16 is a graph showing a change in position with time in the case where a voltage has an isosceles triangular waveform.
Figure 17:
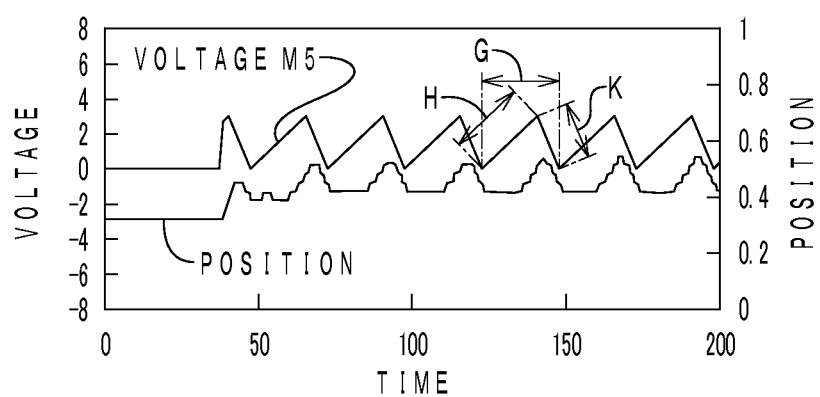
FIG. 17 is a graph showing a change in position with time in the case where a voltage has a triangular waveform with a sharply increasing gradient to the right.
Figure 18:
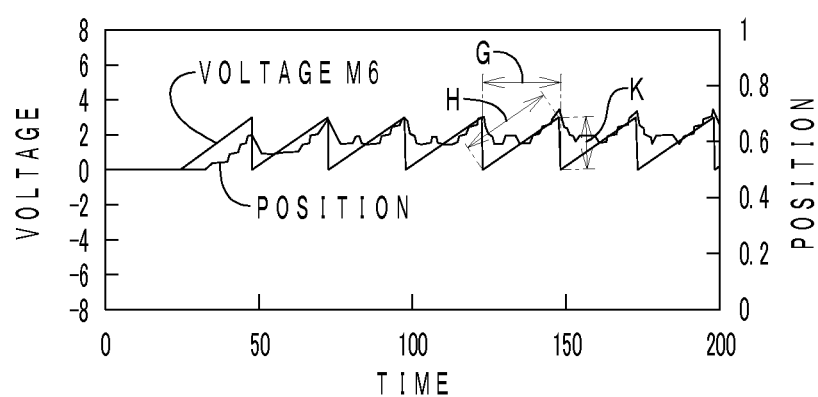
FIG. 18 is a graph showing a change in position with time in the case where a voltage has a right triangular waveform with a sharply increasing gradient to the right.
Figure 19:
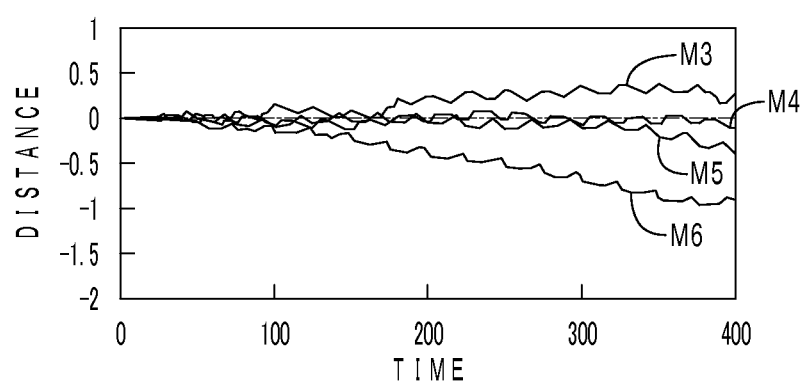
FIG. 19 is a graph showing a change in distance with time in the case of FIGS. 15 to 19.

In Experiment 7, the difference in conveying speed depending on the type of waveform (four types of triangular waveforms) of the voltage (DC voltage whose polarity is not inverted) was examined. The sample used in Experiment 7 is Example 2 of Table 1. FIG. 15 shows a change in position with time in the case where the voltage has a right triangular waveform with a sharply increasing gradient to the left. FIG. 16 shows a change in position with time in the case where the voltage has an isosceles triangular waveform. FIG. 17 shows a change in position with time in the case where the voltage has a triangular waveform with a sharply increasing gradient to the right. FIG. 18 shows a change in position with time in the case where the voltage has a right triangular waveform with a sharply increasing gradient to the right. FIG. 19 shows a change in distance with time in the case of FIGS. 15 to 18. The waveforms of voltages M3 to M6 shown in FIGS. 15 to 18 were produced by the waveform adjustment unit 42 shown in FIG. 7. The waveform of the voltage M6 in FIG. 18 is similar to that of the voltage M2 in FIG. 13.

As shown in FIGS. 15 to 18, a waveform G, for one period, of a change in voltage M3 to M6 with time includes a boost section H and a step-down section K. As shown in FIG. 15, in the case where the voltage M3 has a right triangular waveform with a sharply increasing gradient to the left (an earlier point in time), the absolute value of a time differential value of the voltage M3 in the boost section H is larger than that of the time differential value of the voltage M3 in the step-down section K. As shown in FIG. 16, in the case where the voltage M4 has an isosceles triangular waveform, the absolute value of a time differential value of the voltage M4 in the boost section H is the same as that of the time differential value of the voltage M4 in the step-down section K. As shown in FIG. 17, in the case where the voltage M5 has a triangular waveform with a sharply increasing gradient to the right (a later point in time), the absolute value of a time differential value of the voltage M5 in the boost section H is slightly smaller than that of the time differential value of the voltage M5 in the step-down section K. As shown in FIG. 18, in the case where the voltage M6 has a right triangular waveform with a sharply increasing gradient to the right, the absolute value of a time differential value of the voltage M6 in the boost section H is smaller than that of the time differential value of the voltage M6 in the step-down section K.

As shown in FIG. 19, in the case where the waveform G is any of the four types of triangular waveforms, the object W can be transported although there is differences in conveying direction and conveying speed among the four triangular waveforms. As shown by M5 and M6 in FIG. 19, the object W is less likely to move in the reverse direction if the absolute value of the time differential value of the voltage M5, M6 in the boost section H is made smaller than that of the time differential value of the voltage M5, M6 in the step-down section K. Moreover, the smaller the ratio between the absolute values (=(the absolute value of the time differential value of the voltage M5, M6 in the boost section H)/(the absolute value of the time differential value of the voltage M5, M6 in the step-down section K) is, the higher the conveying speed is. As shown by M3 in FIG. 19, the object W can be moved in the reverse direction by making the absolute value of the time differential value of the voltage M3 in the boost section H larger than that of the time differential value of the voltage M3 in the step-down section K.

<Experiment 8>

Figure 21:
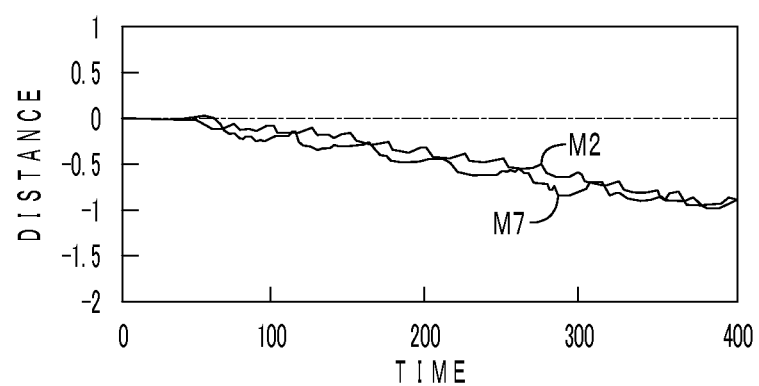
FIG. 21 is a graph showing a change in distance with time in the case of FIG. 20.

In Experiment 8, the voltage (DC voltage whose polarity is not inverted) had a right triangular waveform with a sharply increasing gradient to the right (a later point in time). Moreover, in Experiment 8, the interval during which the voltage is off is set between each pair of waves that are located next to each other in chronological order. The conveying speed was examined in Experiment 8. The sample used in Experiment 8 is Example 2 of Table 1. FIG. 20 shows a change in position with time in the case where the voltage has a right triangular waveform with a sharply increasing gradient to the right and the interval during which the voltage is off is set between each pair of waves that are located next to each other in chronological order. FIG. 21 shows a change in distance with time in the case of FIG. 20. In FIG. 21, the voltage M2 of FIG. 14 is shown together with the voltage M7 of FIG. 20 for comparison.

As shown in FIGS. 13 and 20, the waveform G of the voltage M2 is the same as that of the voltage M7. The period, wavelength, and peak-to-peak value of the waveform G of the voltage M2 are the same as those of the waveform G of the voltage M7. However, as shown by hatched areas in FIG. 20, the interval during which the voltage is off is set between each pair of waves G of the voltage M7 which are located next to each other. The width of the interval is the same as that of the waveform G. As shown in FIG. 13, the interval during which the voltage is off is not set between each pair of waves G of the voltage M2 which are located next to each other. The waves G are continuous. The frequency of the voltage M7 is therefore half the frequency of the voltage M2.

As shown in FIG. 21, the conveying speed is substantially the same between the voltage M2 (with no interval) and the voltage M7 (with the intervals). At the voltage V7, the frequency can be reduced with respect to the voltage M2 while ensuring a similar transport speed.

<Experiment 9>

Figure 22:
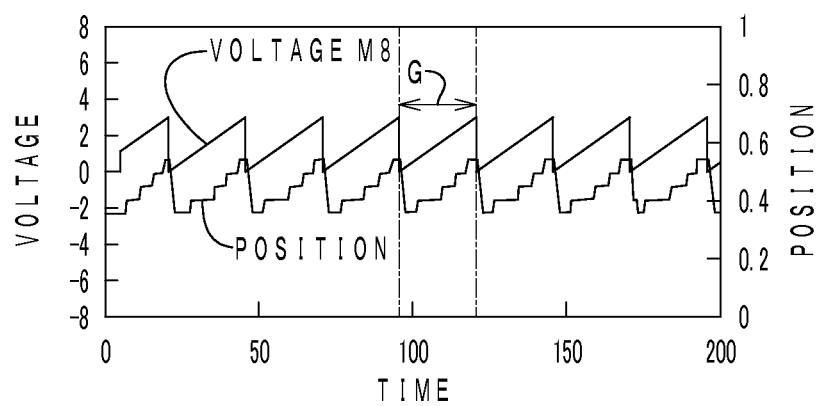
FIG. 22 is a graph showing a change in position with time in the case where a voltage has a right triangular waveform with a sharply increasing gradient to the right.

In Experiment 9, the voltage (DC voltage whose polarity is not inverted) had a right triangular waveform with a sharply increasing gradient to the right (a later point in time), and the conveying speed was examined. The sample used in Experiment 9 is Example 2 of Table 1 with the seven strip portions 210, the joint portion 211, and the clearance F of FIG. 8 formed in all of the electrode layers 21. FIG. 22 shows a change in position with time in the case where the voltage has a right triangular waveform with a sharply increasing gradient to the right. FIG. 23 shows acceleration of extension/contraction of the conveying portion in the case of FIG. 22. FIG. 24 shows a change in distance with time in the case of FIG. 22. In FIGS. 23 and 24, a part of the voltage M2 in FIG. 14 (a part corresponding to time 0 to 200) is shown together with the voltage M8 of FIG. 22 for comparison. In FIG. 23, the positive direction of the ordinate represents acceleration in the extension direction, and the negative direction of the ordinate represents acceleration in the contraction direction.

As shown in FIGS. 13 and 22, the waveform G of the voltage M2 is the same as that of the voltage M8. The period, wavelength, and peak-to-peak value of the waveform G of the voltage M2 are the same as those of the waveform G of the voltage M8. As shown in FIG. 23, the extension acceleration and the contraction acceleration of the conveying portion 2b are larger at the voltage M8 (the sample of Experiment 9, shown by solid line) than at the voltage M2 (Example 2, shown by dashed line). Particularly at the voltage M8, the contraction acceleration can be increased with respect to the extension acceleration. Namely, the conveying portion 2b can be slowly extended and quickly contracted. Accordingly, as shown in FIG. 24, the conveying speed can be higher at the voltage M8 (the sample of Experiment 9) than at the voltage M2 (Experiment 2).

As shown in FIG. 1 (Example 2 of Table 1) and FIG. 8 (the sample of Experiment 9), the electrode layers 21 of the sample of Experiment 9 have a smaller area as compared to Example 2 as viewed from above. This can reduce a current value required to drive the conveying portion 2b.

DESCRIPTION OF THE REFERENCE NUMERALS

1: conveying apparatus
2: conveying member
2a: base portion
2b: conveying portion
20: dielectric layer
21: electrode layer
210: strip portion
211: joint portion
22: conveying path
220: rib
23: protective layer
30: restraining member
31: backing member
310: restraining portion
32: connector
4: power supply unit
40: AC power supply
41: DC power supply
42: waveform adjustment unit
5: control unit
6: displacement sensor (detection unit)
91: cushioning member 10: conveying unit
E: distance
F: clearance
G: waveform
H: boost section
K: step-down section
L1: clearance in up-down direction
O1: overlapping portion
Vdc: DC voltage
Vmax: maximum value
Vmin: minimum value
Vp: amplitude
Vpp: peak-to-peak value
W: object to be transported
a1: extension acceleration
a2: contraction acceleration

The invention claimed is:

1. A conveying apparatus, comprising:
 a conveying member that has a dielectric layer having insulating properties and made of an elastomer and a pair of electrode layers placed on both front and back sides of the dielectric layer and having conductive properties, and that is divided into a base portion and a conveying portion being more easily elastically deformed than the base portion and having on its surface a conveying path on which an object to be transported is transported; and
 a power supply unit that applies between the pair of electrode layers a voltage that changes periodically with time, wherein
 the conveying portion is elastically extended and contracted with the base portion as a starting point according to a change in the voltage, so that the object is transported on the conveying path.

2. The conveying apparatus according to claim 1, wherein
 a conveying direction is a direction in which the conveying path extends on the surface of the conveying portion, and
 the base portion is placed at one end or the other end of the conveying path in the conveying direction.

3. The conveying apparatus according to claim 1, further comprising:
 a restraining member that restrains a part of the conveying member, and
 the base portion is formed by restraining the part of the conveying member by the restraining member.

4. The conveying apparatus according to claim 1, wherein
 the conveying direction is the direction in which the conveying path extends on the surface of the conveying portion, and a lateral direction is a direction perpendicular to the conveying direction, and
 a total length of the conveying path in the conveying direction is larger than that of the conveying path in the lateral direction.

5. The conveying apparatus according to claim 1, wherein
 the conveying member has a protective layer having insulating properties and made of an elastomer, the protective layer being placed on the frontmost electrode layer.

6. The conveying apparatus according to claim 1, further comprising:
 a backing member that is placed on a back side of the conveying member and that slide-contacts the conveying portion when the conveying portion is elastically extended and contracted.

7. The conveying apparatus according to claim 1, wherein
 the power supply unit has a DC power supply capable of supplying a voltage whose polarity is not inverted or an AC power supply capable of supplying a voltage whose polarity is inverted and a waveform adjustment unit that adjusts a waveform of the voltage that is supplied from the DC power supply or the AC power supply.

8. The conveying apparatus according to claim 1, wherein
 the power supply unit has a DC power supply capable of supplying a bias voltage whose polarity is not inverted and which has constant magnitude and an AC power supply capable of supplying a voltage whose polarity is inverted.

9. The conveying apparatus according to claim 1, wherein
 the voltage that is applied between the pair of electrode layers by the power supply unit is a DC voltage whose polarity is not inverted.

10. The conveying apparatus according to claim 9, wherein
 a waveform, for one period, of a change in the DC voltage with time has a boost section where the DC voltage increases with time and a step-down section where the DC voltage decreases with time, and
 an absolute value of a time differential value of the DC voltage in the boost section is smaller than that of the time differential value of the DC voltage in the step-down section.

11. The conveying apparatus according to claim 1, further comprising:
 a control unit that controls the power supply unit.

12. The conveying apparatus according to claim 11, further comprising:
 a detection unit that detects extension and contraction of the conveying portion, and
 the control unit controls the power supply unit based on a detection value of the detection unit.

13. The conveying apparatus according to claim 1, wherein
 the conveying direction is the direction in which the conveying path extends on the surface of the conveying portion, and the lateral direction is the direction perpendicular to the conveying direction,
 the electrode layer has a plurality of strip portions extending in the conveying direction and arranged next to each other in the lateral direction, and
 clearance is provided between a pair of the strip portions adjacent to each other in the lateral direction.

\* \* \* \* \*